United States Patent
Kim et al.

(10) Patent No.: US 9,569,046 B2
(45) Date of Patent: Feb. 14, 2017

(54) TOUCH CONTROLLER INCLUDING A PLURALITY OF DETECTORS TO DETECT ELECTRICAL CHANGE, ELECTRONIC DEVICE AND DISPLAY DEVICE INCLUDING TOUCH CONTROLLER, AND TOUCH SENSING METHOD

(71) Applicants: Jin-Bong Kim, Yongin-si (KR); Yoon Kyung Choi, Seoul (KR); Jong-Oh Lee, Anyang-si (KR); Bum-Soo Kim, Seoul (KR); Steve J. Kim, Seongnam-si (KR)

(72) Inventors: Jin-Bong Kim, Yongin-si (KR); Yoon Kyung Choi, Seoul (KR); Jong-Oh Lee, Anyang-si (KR); Bum-Soo Kim, Seoul (KR); Steve J. Kim, Seongnam-si (KR)

(73) Assignee: SAMSUNG ELECTRONICS CO., LTD., Gyeonggi-do (KR)

( * ) Notice: Subject to any disclaimer, the term of this patent is extended or adjusted under 35 U.S.C. 154(b) by 93 days.

(21) Appl. No.: 14/332,520

(22) Filed: Jul. 16, 2014

(65) Prior Publication Data
US 2015/0103035 A1    Apr. 16, 2015

(30) Foreign Application Priority Data
Oct. 11, 2013 (KR) .................. 10-2013-0121504

(51) Int. Cl.
G06F 3/044    (2006.01)
G06F 3/041    (2006.01)

(52) U.S. Cl.
CPC .............. *G06F 3/044* (2013.01); *G06F 3/041* (2013.01); *G06F 2203/04101* (2013.01); *G06F 2203/04104* (2013.01); *G06F 2203/04108* (2013.01)

(58) Field of Classification Search
None
See application file for complete search history.

(56) References Cited

U.S. PATENT DOCUMENTS

| | | | |
|---|---|---|---|
| 7,692,638 B2 | 4/2010 | Land et al. | |
| 7,812,827 B2 | 10/2010 | Hotelling et al. | |
| 2009/0278816 A1 | 11/2009 | Colson | |
| 2012/0050211 A1 | 3/2012 | King et al. | |
| 2013/0278560 A1* | 10/2013 | Yamaguchi | G06F 3/044 345/174 |
| 2013/0307821 A1* | 11/2013 | Kogo | G06F 3/044 345/174 |
| 2014/0282070 A1* | 9/2014 | Jeon | G06F 3/04842 715/748 |

FOREIGN PATENT DOCUMENTS

JP    2011-221977 A    11/2011

\* cited by examiner

*Primary Examiner* — David D Davis
(74) *Attorney, Agent, or Firm* — Harness, Dickey & Pierce, P.L.C.

(57) ABSTRACT

A touch sensing device includes a touch screen panel including a touch sensor configured to generate a first electrical change corresponding to a touch and a touch controller configured to detect touch position data with respect to an area on the touch screen panel associated with the touch, based on the first electrical change or the touch sensor.

16 Claims, 34 Drawing Sheets

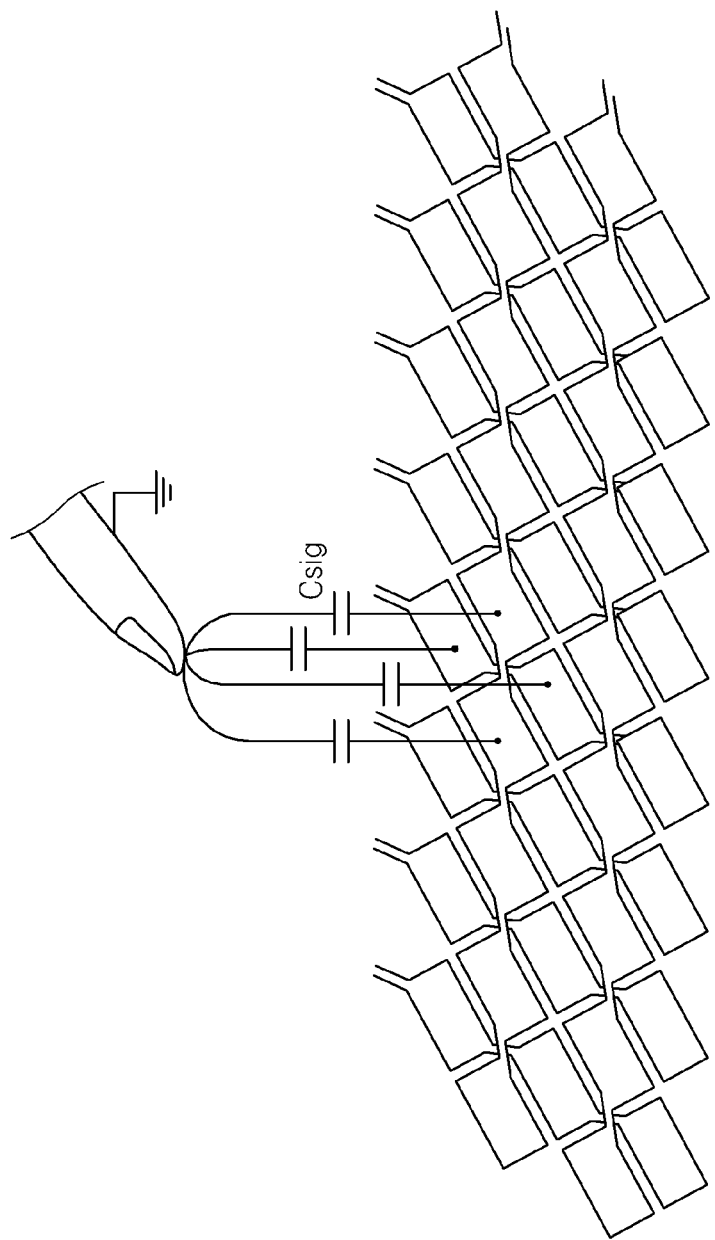

TOUCH CONTROLLER INCLUDING A PLURALITY OF DETECTORS TO DETECT ELECTRICAL CHANGE, ELECTRONIC DEVICE AND DISPLAY DEVICE INCLUDING TOUCH CONTROLLER, AND TOUCH SENSING METHOD

CROSS-REFERENCE TO RELATED APPLICATIONS

This application claims priority to Korean Patent Application No. 10-2013-0121504, filed on Oct. 11, 2013, in the Korean Intellectual Property Office, the disclosure of which is incorporated herein in its entirety by reference.

BACKGROUND

Some inventive concepts relate to a touch controller, a display device and an electronic device including the touch controller, and/or a touch sensing method.

SUMMARY

Some inventive concepts provide a touch controller capable of improving touch sensitivity, a display device and an electronic device including the touch controller, and a touch sensing method.

Some inventive concepts provide a touch controller that is capable of operating with low power consumption, a display device and an electronic device including the touch controller, and a touch sensing method According to an example embodiment of inventive concepts, there is provided a touch sensing device including a touch screen panel including a touch sensor configured to generate a first electrical change corresponding to a touch and a touch controller configured to detect touch position data with respect to an area on the touch screen panel in which the touch is generated, based on the first electrical change of the touch sensor, the touch controller including, a first detection unit configured to detect the first electrical change in the touch sensor in a first mode as is plurality of pieces of candidate position data with respect to an area where at least two hoverings are generated and a second detection unit configured to detect a second electrical change in at least one area of the touch sensor corresponding to the plurality of pieces of candidate position data in a second mode that is different from the first mode, to select the touch position data with respect to the at least two hoverings based on the second electrical change.

According to an example embodiment of inventive concepts, there is provided a touch sensing device including a touch screen panel comprising a touch sensor in which an electrical change corresponding to a touch is generated and a touch controller for receiving the electrical change by applying a driving voltage to the touch sensor and outputting data corresponding to an area where the touch is generated, wherein in a hovering mode, the touch controller primarily processes the electrical change corresponding to the touch in a single touch mode, and secondarily processes the electrical change corresponding to the touch in a multi-touch mode.

According to another example embodiment of inventive concepts, there is provided a display device including a touch screen panel including, a sensing array having a plurality of rows and a plurality of columns connected to a plurality of sensing units, the sensing array configured to generate a change in capacitance in areas of the sensing array corresponding to a plurality of concurrently generated hoverings and a touch controller configured to detect as plurality of pieces of candidate position data based on a first reception voltage corresponding to the change in capacitance in a single touch mode, process the plurality of pieces of candidate position data in a multi-touch mode, and detect touch position data with respect to an area of the sensing array corresponding to each of the plurality of hoverings.

According to another example embodiment of inventive concepts, there is provided is touch sensing method including determining whether a hovering is generated with respect to a touch screen panel, extracting touch position data including a ghost, with respect to the hovering, in a singe touch mode based on the determining, removing the ghost from the touch position data in a multi-touch mode, based on the touch position data extracted in the single touch mode and processing the touch position data from which the ghost is removed, as position data with respect to the hovering.

At least one example embodiment discloses a touch sensing device including a touch panel including a plurality of sensing circuits, the plurality of sensing circuits configured to generate sensing signals in response to a driving voltage and a touch controller configured to apply the driving voltage to the sensing circuits in a first mode and apply the driving voltage to at most a portion of the sensing circuits in a second mode based on the sensing signals.

BRIEF DESCRIPTION OF THE DRAWINGS

Example embodiments of inventive concepts will be more clearly understood from the following detailed description taken in conjunction with the accompanying drawings in which:

FIG. 7B is a diagram to explain is detection object of the first detection unit of FIG. 7A, according to an example embodiment of inventive concepts;

DETAILED DESCRIPTION OF EXAMPLE EMBODIMENTS

Figure 1:
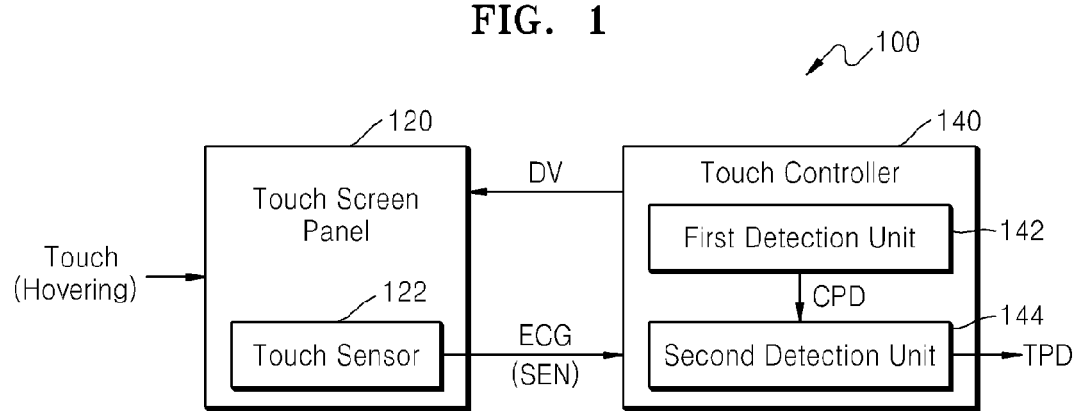
FIG. 1 is a block diagram illustrating a touch sensing device according to an example embodiment of inventive concepts.

The attached drawings for illustrating example embodiments of inventive concepts are referred to in order to gain a sufficient understanding of inventive concepts, the merits thereof, and the objectives accomplished by the implementation of inventive concepts. Hereinafter, inventive concepts will be described in detail by explaining example embodiments with reference to the attached drawings. Like reference numerals in the drawings denote like elements.

As used herein, the term "and/or" includes any and all combinations of one or more of the associated listed items. Expressions such as "at least one of," when preceding a list of elements, modify the entire list of elements and do not modify the individual elements of the list.

FIG. 1 is a block diagram illustrating a touch sensing device 100 according to an example embodiment of inventive concepts. The touch sensing device 100 includes a touch screen panel 120 and a touch controller 140. The touch screen panel 120 generates an electrical change ECG corresponding to a touch that is generated by contacting or approaching the touch screen panel 120. The electrical change ECG may be sensed in response to a driving voltage DV applied by using the touch controller 140. The electrical change ECG may be transmitted to the touch controller 140 as a sensing value SEN.

Hereinafter, a touch generated by contacting the touch screen panel 120 will be referred to as a contact touch. Also, a touch generated by approaching the touch screen panel 120 but not actually touching it, that is, a touch generated at is distance spatially apart from the touch screen panel 120 will be referred to as a hovering. The touch screen panel 120 includes a touch sensor 122 that generates an electrical change ECG with respect to a contact touch or a hovering.

Figure 2:
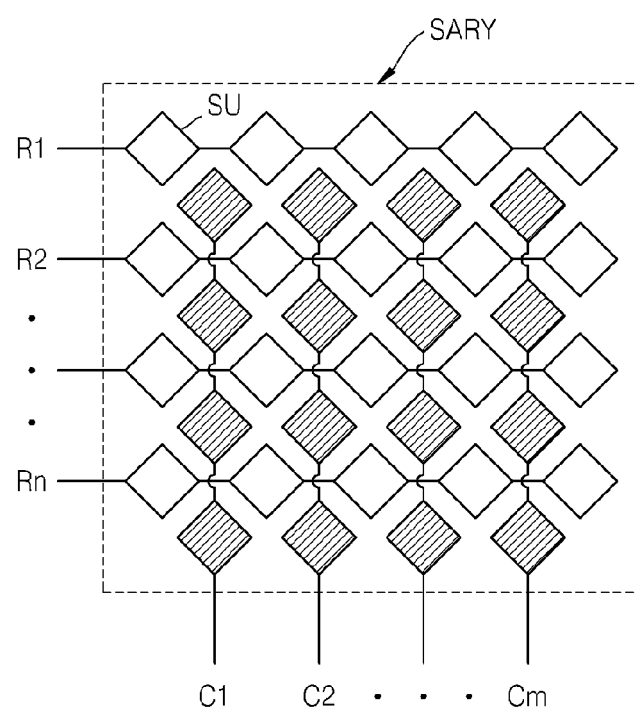
FIG. 2 illustrates a touch sensor of FIG. 1 according to an example embodiment of inventive concepts.

FIG. 2 illustrates the touch sensor 122 of FIG. 1 according to an example embodiment of inventive concepts. Referring to FIGS. 1 and 2, the touch sensor 122 may include a sensing array SARY including a plurality or rows R1, R2, . . . , Rn, to which a plurality of sensing units SU are electrically connected, and a plurality of columns C1, C2, . . . , Cm, to which as plurality of sensing units SU are electrically connected. The touch sensor 122 may be a mutual capacitive touch sensor in which the sensing units SU generate a change in capacitance, according to a touch.

Figure 3:
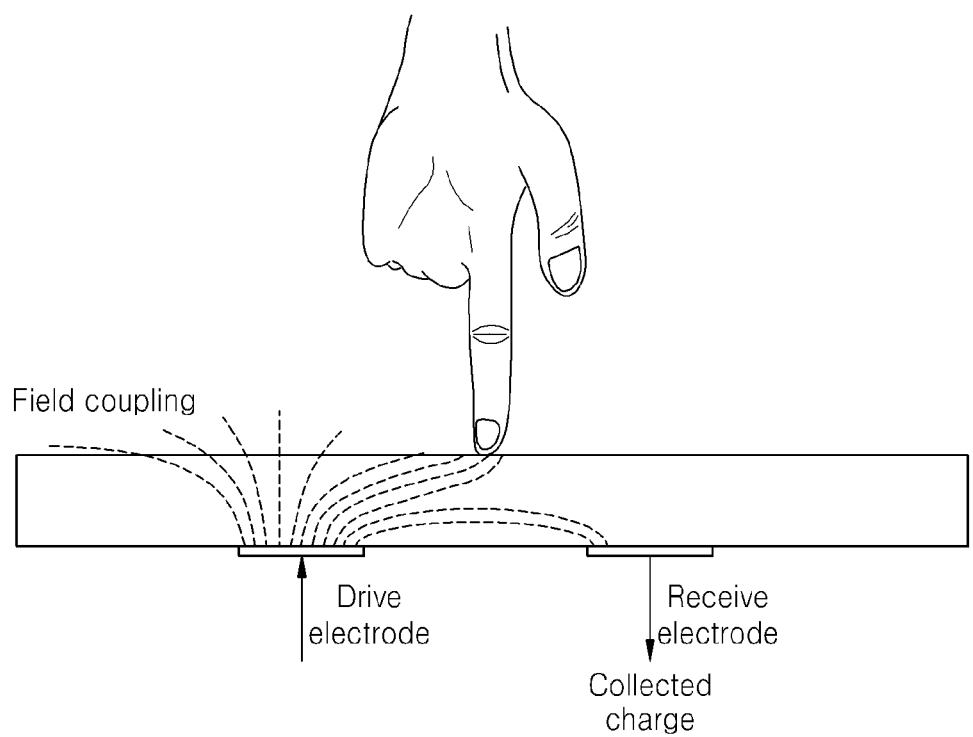
FIG. 3 is a diagram to explain a change in capacitance due to a touch when a mutual capacitive touch screen panel is used.

FIG. 3 is a diagram to explain a change in capacitance due to a touch when a mutual capacitance touch screen panel is used. Referring to FIG. 3, according to a mutual capacitance method, a voltage pulse is applied to a driving electrode, and a charge corresponding to a voltage pulse is collected by a receive electrode. When the finger of a person is placed between two electrodes, an electrical field (dotted line) is changed. A change in the electrical field causes a change in capacitance. Although FIG. 3 illustrates a contact touch, a hovering also causes a change in an electrical field. Also, although a contact touch by the finger is illustrated in FIG. 3, a change in an electrical field is also generated due to as touch via other conductors such as a touch pen.

Capacitance between electrodes is changed by a change in an electrical field between two electrodes, and a touch is sensed based on the change in the electrical field. However, example embodiments of inventive concepts are not limited thereto. While FIG. 3 illustrates that a change in an electrical field due to a touch is sensed by a receive electrode, a change in capacitance may also be sensed from both electrodes.

Figure 4:
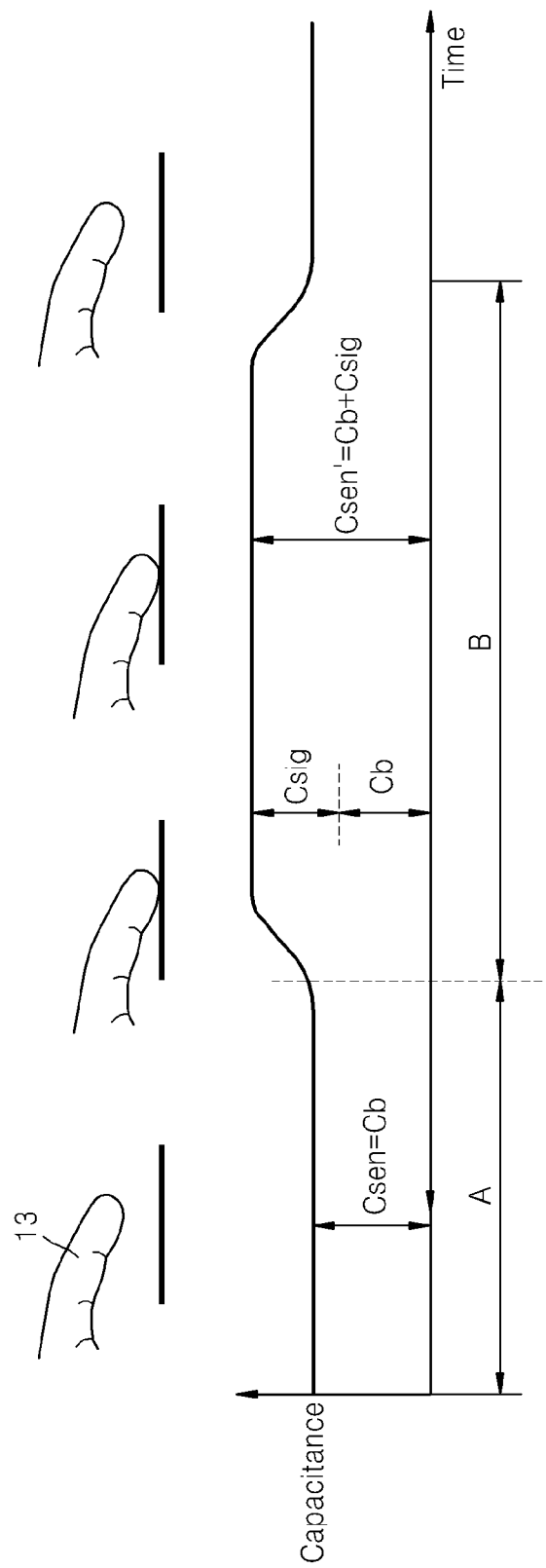
FIG. 4 is a graph showing a variation in capacitance according to a touch.

FIG. 4 is a graph showing a variation in capacitance according to a touch. Referring to FIGS. 2 and 4, each of the sensing units SU has a parasitic capacitance component Cb. For example, each of the sensing units SU may have a parasitic capacitance component Cb including a horizontal parasitic capacitance component generated between adjacent sensing units and a vertical parasitic capacitance component between arbitrary electrodes (e.g., a common voltage electrode or a ground voltage electrode). The vertical parasitic capacitance component will be described in further detail.

Figure 5:
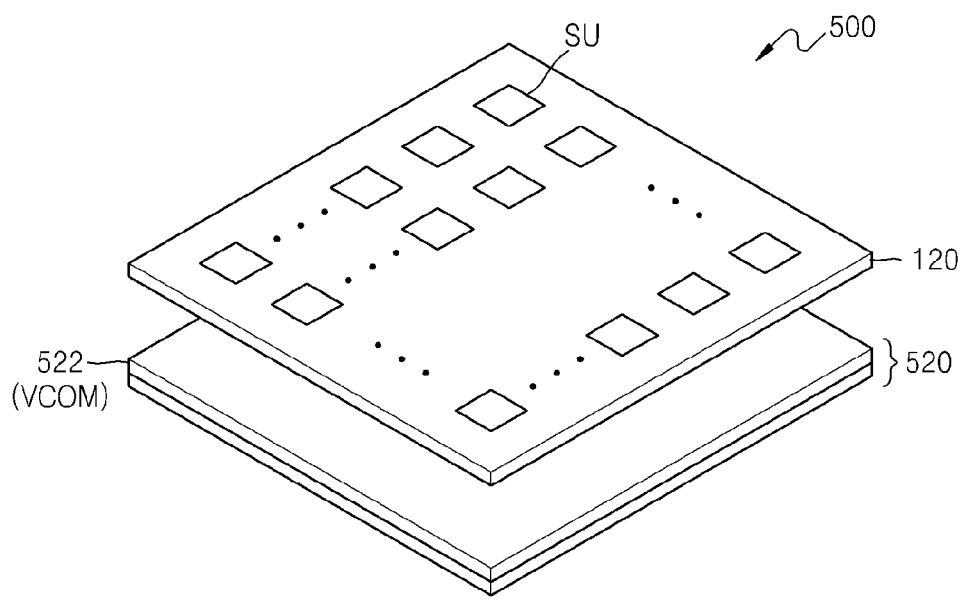
FIG. 5 illustrates a portion of a display device including the touch sensing device of FIG. 1, according to an example embodiment of inventive concepts.

FIG. 5 illustrates a portion of a display device 500 including the touch sensing device 100 of FIG. 1, according to an example embodiment of inventive concepts. Referring to FIG. 5, the display device 500 may include a display panel 520 and a touch screen panel 120. The display device 500 may be, for example, a liquid crystal device (LCD), a field emission display device (FED), an organic light emitting display (OLED), or a plasma display device (PDP). The display panel 520 may have a structure and may be formed of a material corresponding to a type of the display device 500.

To provide process or price competitiveness, the touch screen panel 120 may be integrated with the display panel 520 of the display device 500. FIG. 5 illustrates the touch screen panel 120 mounted on the display panel 520. However, example embodiments of inventive concepts are not limited thereto, and the touch screen panel 120 may also be disposed under the display panel 520. For convenience of description, an example in which the touch screen panel 120 is disposed on the display panel 520 will be described. The touch screen panel 120 may be spaced apart from the display panel 520 by a distance or may be attached to an upper plate of the display panel 520. For example, when the display panel 520 is a liquid crystal display panel, the upper plate of the display panel 520 may include a common voltage electrode 522. In this case, a vertical parasitic capacitance component Cv may be formed between each of the sensing units SU and the common voltage electrode 522. However, example embodiments of inventive concepts are not limited thereto, and a vertical parasitic capacitance component Cv may also be formed between each of the sensing units SU and a ground voltage electrode included in the touch screen panel 120.

While FIG. 5 illustrates an On-cell type display in which the display panel 520 is included as panel or a layer that is separate from the touch screen panel 120, example embodiments of inventive concepts are not limited thereto.

Figure 6:
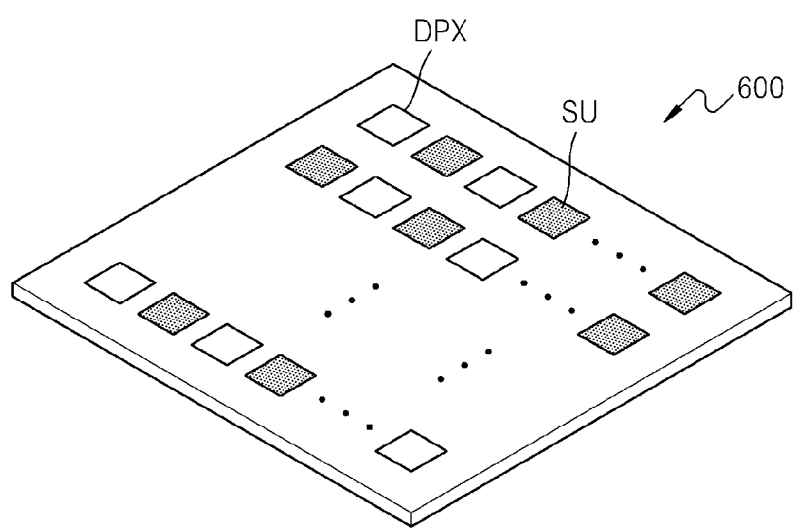
FIG. 6 illustrates a portion of a display device including the touch sensing device of FIG. 1, according to another example embodiment of inventive concepts.

FIG. 6 illustrates a portion of a display device 600 including the touch sensing device 100 of FIG. 1, according to another example embodiment of inventive concepts. Referring to FIG. 6, the display device 600 may be an In-Cell type display in which display pixels DPX used in displaying and sensing units SU used in sensing a touch are formed in the same layer.

While FIG. 6 illustrates an arrangement in which the same number of display pixels DPX and the same number of sensing units SU are alternately arranged on a common panel, other arrangements may be implemented. Unlike FIG. 6, more display pixels DPX may be included than sensing units SU. Alternatively, display pixels DPX and sensing units SU may be arranged in a different arrangement from that of FIG. 6. Also, each of the display pixels DPX of FIG. 6 may include R, G, and B pixels.

Referring to FIGS. 2 and 4 again, in the sensing array SARY including a parasitic capacitance as described above, a capacitance Csen of the sensing unit SU may have a value Cb corresponding to a parasitic capacitance in a section A of FIG. 4 where no touch is generated. A section B of FIG. 4 denotes an example where a conductive material has contacted the sensing unit SU. In this case, a capacitance (Csen'=Cb+Csig) increases as the parasitic capacitance component Cb and a capacitance component Csig generated between the finger and the touch screen panel 120 are additionally generated.

However, example embodiments of inventive concepts are not limited thereto. While FIG. 4 illustrates an example in which capacitance increases due to a touch, the touch sensing device 100 of FIG. 1 may also be designed such that capacitance decreases due to a touch. For example, as illustrated in FIG. 3, as a portion of an electrical field formed between a driving electrode and a receive electrode is blocked due to a touch, capacitance that is proportional to an intensity of an electrical field may be reduced. In this case, the touch sensing device 100 may perceive this as a touch generated in a section of the sensing array SARY where capacitance decreases.

Referring to FIG. 1 again, in response to the change in capacitance as described above, the touch controller 140 detects touch position data TPD with respect to an area on the touch screen panel 120 where a touch is generated is generated. The touch position data TPD, that is, the area where a touch is generated, may be represented as a position of at least one sensing unit SU on the sensing array SARY of FIG. 2. Hereinafter, a structure and operation of the touch controller 140 will be described in further detail.

The touch controller 140 includes a first detection unit 142 and a second detection unit 144. If at least two hoverings occur with respect to the touch screen panel 120, the first detection unit 142 detects an electrical change ECG of the touch sensor 122 in a first mode, as a plurality of pieces of candidate position data CPD with respect to each hovering. The second detection unit 144 detects an electrical change in an area of the touch sensor 122 corresponding to the plurality of pieces of candidate position data CPD in a second mode different from the first mode to select the touch position data TPD with respect to the at least two hoverings.

The first mode is a touch sensing mode in which a sensing sensitivity with respect to a hovering is higher than the second mode, and the second mode may be a touch sensing mode in which more touches may be sensed at a time than in the first mode. For example, the first mode may be a single touch mode in which only a single touch is recognized at a time, and the second mode may be a multi-touch mode in which multiple touches are sensed at a time. The single touch mode may use a touch sensing method in which a change in capacitance between the sensing unit SU and an arbitrary electrode is sensed. A multi-touch mode may use a mutual touch sensing method in which a change in capacitance between adjacent sensing units SU of FIG. 2 due to a touch is sensed.

The multi-touch mode is a mode in which concurrent touches may be sensed, and in the present specification, concurrent touches refer to touches that are physically concurrent with respect to the touch screen panel 120 or multiple touches that are concurrent in terms of an operating timing even though there is a time difference. In addition, the same applies to "simultaneous" used in the present specification. For example, in regard to the description with reference to FIG. 8 of switches SWR1, SWR2, . . . , SWRn, SWC1, SWC2, . . . , SWCm of FIG. 7A being simultaneously turned on it may indicate that the switches are either physically simultaneously turned on or the touch controller 140 may process the switches by treating them as being simultaneously turned on.

Figure 7A:
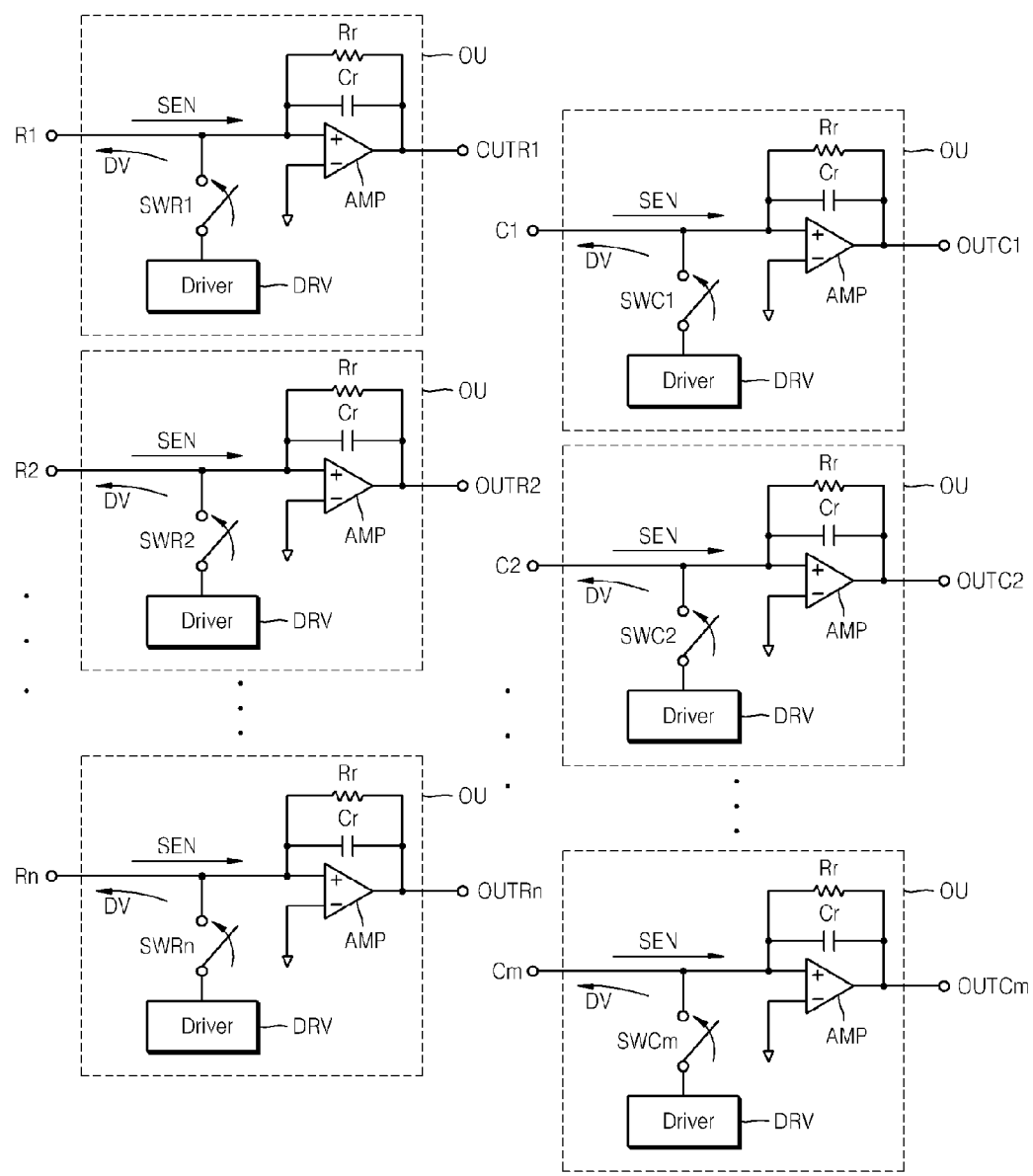
FIG. 7A is a diagram to explain a first detection unit of FIG. 1 operating in a single touch mode, according to an example embodiment of inventive concepts.

FIG. 7A is a diagram to explain the first detection unit 142 of FIG. 1 operating in a single touch mode. FIG. 7B is a diagram to explain a detection object of the first detection unit 142 of FIG. 7A. First, referring to FIGS. 2 and 7A, the first detection unit 142 may include an operating unit OU connected to each of rows R1, R2, . . . , Rn and each of columns C1, C2, . . . , Cm of the sensing array SARY. Alternatively, it may also be described that each operating unit OU is respectively connected to each of the rows R1, R2, . . . , Rn and each of the columns C1, C2, . . . , Cm of the sensing array SARY through channels connected to the each of rows R1, R2, . . . , Rn and the each of columns C1, C2, . . . , Cm of the sensing arrays SARY. Each operating unit OU includes a driver, a switch, and an amplifying unit.

For example, the operating unit OU connected to a first row R1 will be described. The operating unit OU connected to the first row R1 includes a driver DRV, a switch SWR1, and an amplifying unit AMP. The driver DRV applies as driving voltage DV to the first row R1 that is electrically connected to the operating unit OU. The driving voltage DV may be applied as a voltage pulse. The driver DRV may be electrically connected to the first row R1 when a switch SWR1 is turned on.

The amplifying unit AMP outputs an output value OUTR1 corresponding to a sensing value SEN obtained by sensing a change in capacitance of the first row R1 as the driving voltage DV is applied to the first row R1. The output value OUTR1 has different values according to whether a hovering is generated in the first row R1. The amplifying unit AMP may be a charge AMP that converts the output value OUTR1 into a voltage value and amplifies the voltage value according to capacitance of the first row R1. A capacitor Cr and a resistor Rr may be connected in parallel between a first input end (e.g., an inverse terminal) and an output terminal of the amplifying unit AMP. While not illustrated in FIG. 7A, noise of the output value OUTR1 of the amplifying unit AMP may be removed using a filter, and the output value OUTR1 from which noise is removed may be output as a digital value, by using an analog-digital converter.

A structure and operation of the operating unit OU connected to other rows R2, . . . , Rn and the columns C1, C2, . . . , Cm of the sensing array SARY may be the same as the structure and operation of the operating unit OU connected to the first row R1. For example, the operating unit OU connected to the first column C1 includes a driver DRV, a switch SWC1, and an amplifying unit AMP. The driver DRV applies a driving voltage DV to the first column C1, when a switch SWC1 is turned on. The amplifying unit AMP outputs a change in capacitance of the first column C1 as an output value OUTC1 corresponding to a sensing value SEN obtained by sensing the change, according to application of the driving voltage DV to the first column C1. That is, when a change Csig in capacitance is generated by a hovering in sensing electrodes as illustrated in FIG. 7B by an operation of the first detection unit 142 of FIG. 7A, an output value OUTC1 corresponding to the change Csig is output.

Figure 8:
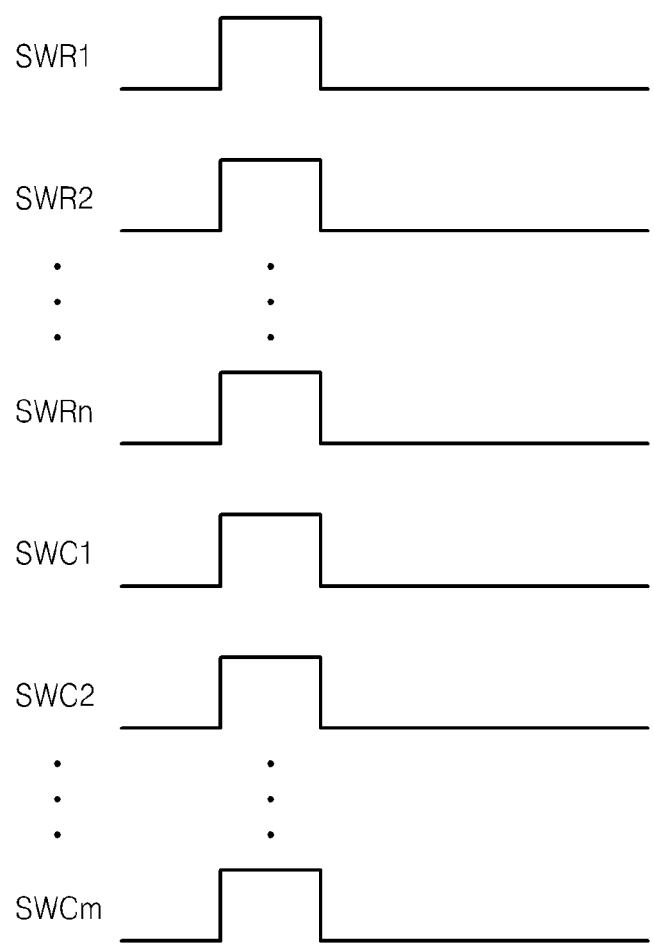
FIG. 8 is a diagram to explain an operation of switches of FIG. 7A according to an example embodiment of inventive concepts.

FIG. 8 is a diagram to explain an operation of switches of FIG. 7A according to an example embodiment of inventive concepts. As illustrated in FIG. 8, the switches SWR1, SWR2, . . . , SWRn, and SWC1, SWC2, . . . , SWCm included in each operating unit OU of the first detection unit 142 may be simultaneously turned on. That is, a driving voltage DV may be simultaneously applied to all rows R1, R2, . . . , Rn and all columns C1, C2, . . . , Cm of the sensing array SARY. Thus, each operating unit OU may simultaneously output a sensing value SEN with respect to a connected row or a connected column as an output value OUTR1, OUTR2, . . . , or OUTRn or OUTC1, OUTC2, . . . , or OUTCm.

Figure 9A:
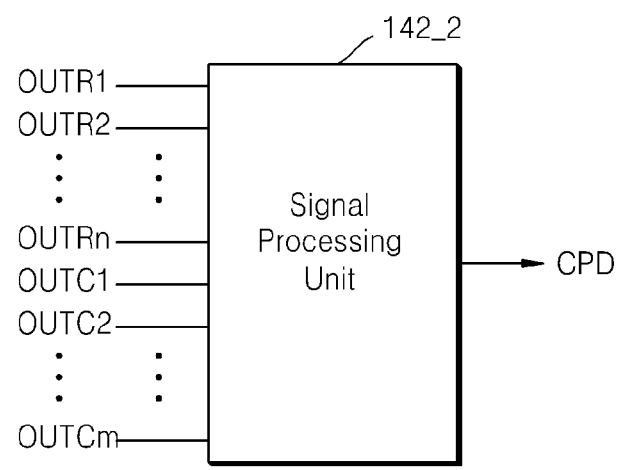
FIG. 9A illustrates a signal processing unit that is further included in the first detection unit of FIG. 7A, according to an example embodiment of inventive concepts.

FIG. 9A illustrates a signal processing unit 142_2 that is further included in the first detection unit 142 of FIG. 7A according to an example embodiment of inventive concepts. Referring to FIGS. 1, 2, and 9A, the signal processing unit 142_2 receives respective output values OUTR1, our OUTR2, . . . , and OUTRn, and respective output values OUTC1, OUTC2, . . . , and OUTCm of operating units OU with respect to the respective rows R1, R2, . . . , Rn and the respective columns C1, C2, . . . , Cm of the sensing array SARY to thereby output candidate position data CPD with respect to each hovering. That is, the candidate position data CPD may be as result of signal processing on the output value OUTR1, OUTR2, . . . , or OUTRn or OUTC1, OUTC2, . . . , or OUTCm of each operating unit OU. However, the candidate position data CPD may also be a result of signal processing performed on a value obtained by filtering the output value of each operating unit OU or by performing analog-digital conversion on the output value of each operating unit OU by using a filter or an analog-digital converter.

Figure 9B:
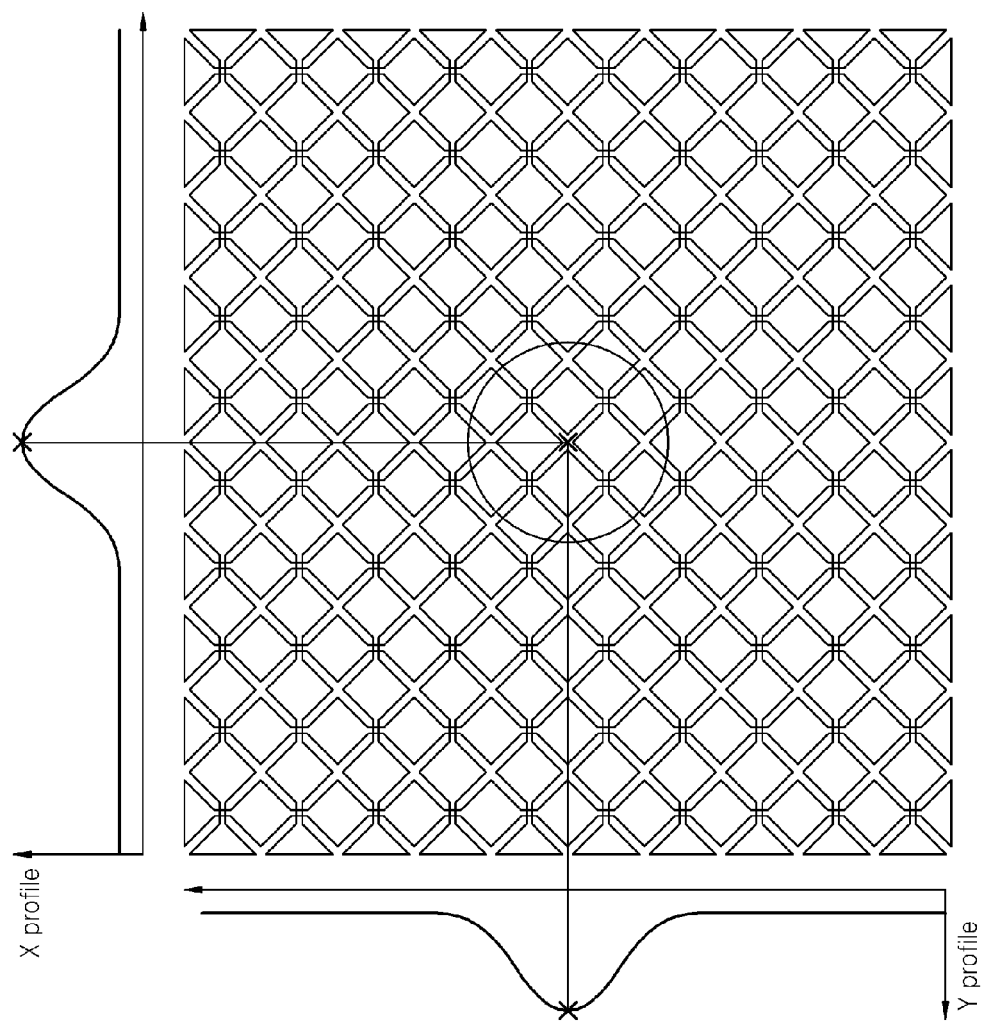
FIG. 9B is a diagram to explain an operating principle of the signal processing unit of FIG. 9A, according to an example embodiment of inventive concepts.

For example, the signal processing unit 142_2 may compare voltages of the output values OUTR1, OUTR2, . . . , OUTRn of the operating unit OU of each of the rows R1, R2, . . . , Rn of the sensing array SARY to detect a row that is included in an area where a hovering is generated. Also, the signal processing unit 142_2 may compare voltages of output values OUTC1, OUTC2, . . . , OUTCm of the operating unit OU of each of the columns C1, C2, . . . , Cm of the sensing array SARY to detect a column included in an area corresponding to a hovering. FIG. 9B is a diagram to explain an operating principle of the signal processing unit of FIG. 9A. For example, referring to FIG. 9B, the signal processing unit 142_2 may interpolate a profile with respect to an x-axis (row axis) and a profile with respect to a y-axis (column axis) and detect a row and a column included, in an area where a hovering is generated. According to this operation, the signal processing unit 142_2 may output an area where the detected row and the detected column cross each other as candidate position data (CPD) corresponding to the hovering.

Figure 10:
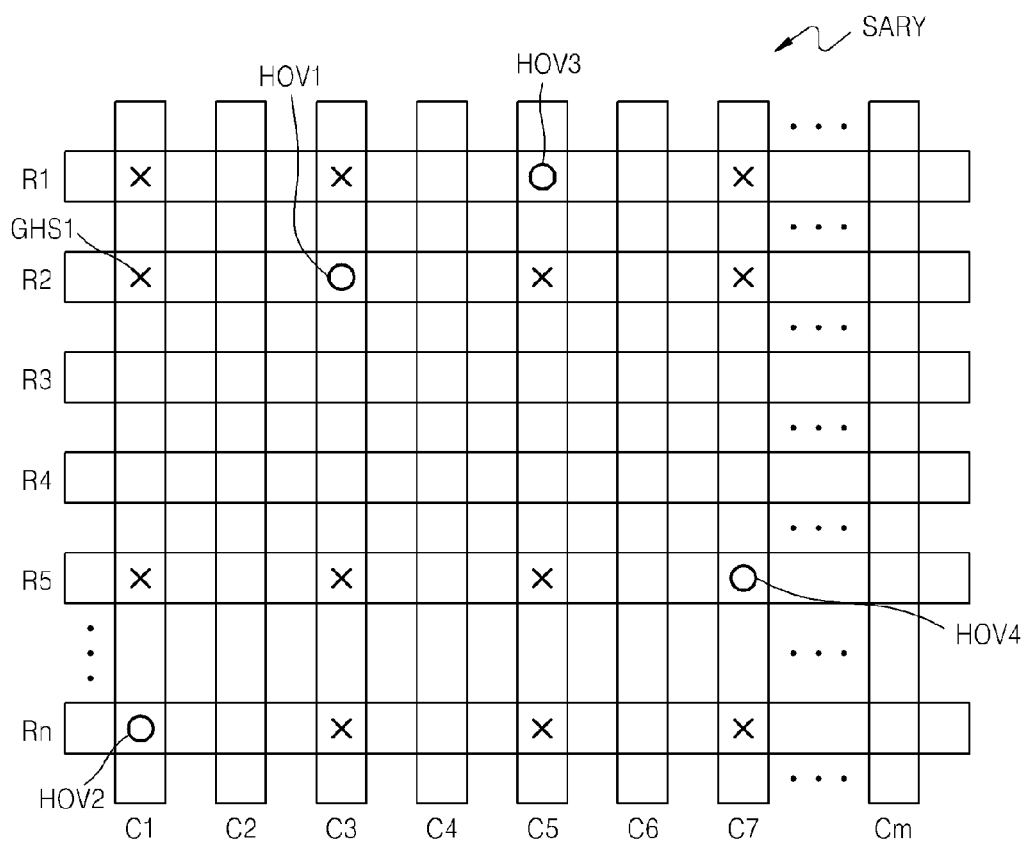
FIG. 10 illustrates candidate position data with respect to a hovering according to an example embodiment of inventive concepts.

FIG. 10 illustrates candidate position data CPD with respect to a hovering according to an example embodiment of inventive concepts. Referring to FIGS. 1, 2, and 10, the number of pieces of the candidate position data CPD generated by using the first detection unit 142 may correspond to the number of generated hoverings. For example, when N hoverings are generated, 2N pieces of candidate position data CPD may be detected. For example, if a hovering is generated by four fingers (marked with circles) as illustrated in FIG. 10, that is, if four hoverings HOV1, HOV2, HOV3, and HOV4 are generated, the first detection unit 142 may detect sixteen pieces of candidate position data CPD.

The candidate position data CPD includes not only hoverings HOV1, HOV2, HOV3, and HOV4 that are actually generated, but also data comprising a ghost marked X. A ghost refers to an event that is processed as a touch or a hovering although it is not actually a generated touch or hovering. In the example of FIG. 10, sixteen pieces of candidate position data CPD with respect to actually generated our hoverings HOV1, HOV2, HOV3, and HOV4 and twelve ghosts are generated. As described above, according to the first detection unit 142 having a structure as illustrated in FIGS. 7A and 8, a sensing operation is performed with respect to all rows R1, R2, . . . , Rn and all columns C1, C2, . . . , Cm of the sensing array SARY, from a row where an actually generated hovering is generated, a plurality of pieces of candidate position data CPD may be calculated by another hovering generated in another row.

In FIG. 10, from among the concurrently generated hoverings, a first hovering HOV1 is generated at an intersection point between a second row R2 and a third column C3, and three ghosts of the second row R2 are detected in a column where second through fourth hoverings HOV2 through HOV4 are generated. For example, as first ghost GHS1 of the second row R2 is detected from an intersection point with respect to the first column C1 where the second hovering HOV2 is generated. That is, when a sensing operation is concurrently performed with respect to all rows R1, R2, . . . , Rn and all columns C1, C2, . . . , Cn of the sensing array SARY, the first detection unit 142 perceives this as four separate hoverings generated with respect to four rows and four columns regarding the four hoverings. Thus, the first detection unit 142 detects sixteen pieces of candidate position data CPD with respect to the intersection points of the respective rows and the respective columns.

Figure 11:
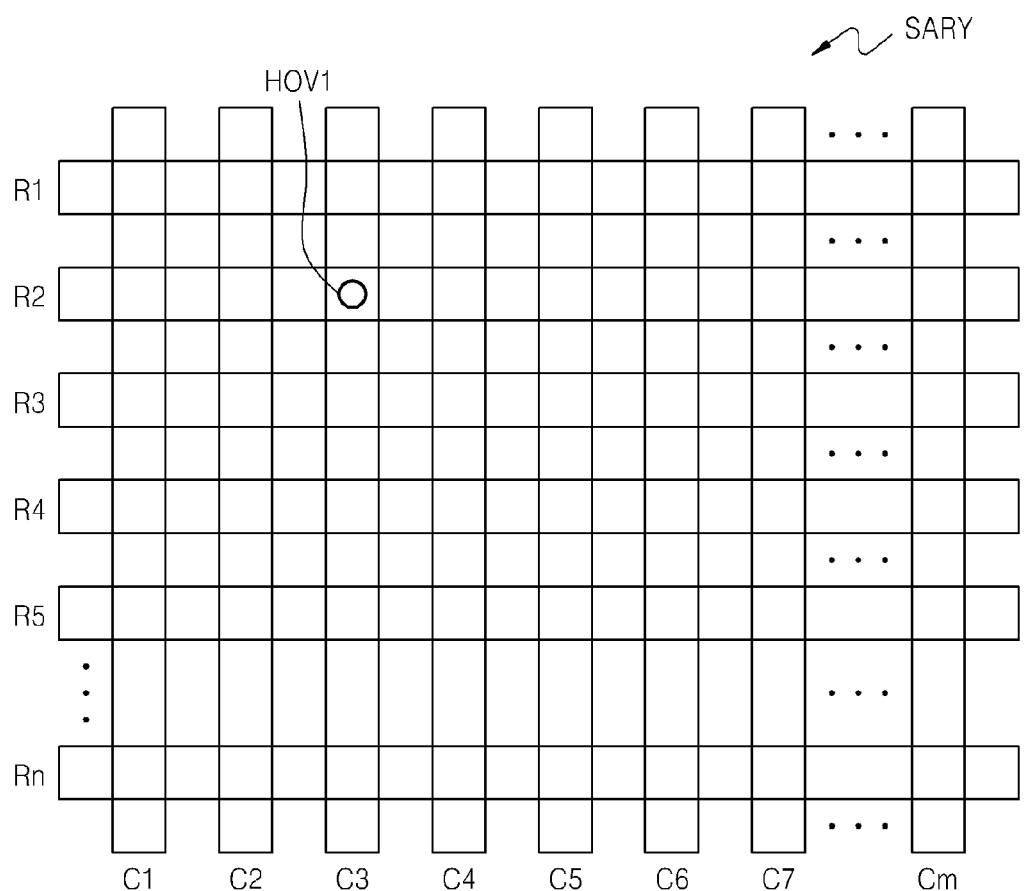
FIG. 11 illustrates candidate position data with respect to a hovering according to another example embodiment of inventive concepts.

FIG. 11 illustrates candidate position data with respect to a hovering according to another example embodiment of inventive concepts. Referring to FIGS. 1 and 11, when one hovering HOV1 is generated, although a sensing operation is performed with respect to all rows R1, R2, . . . , Rn and all columns C1, C2, . . . , Cm of the sensing array SARY, the first detection unit 142 perceives this as a hovering generated only at a single row and a single column with respect to the one hovering HOV1, and thus, a ghost is not recognized. As described above, a detailed operation of the touch controller 140 in the case where a single hovering is generated will be described in detail later.

For reference, in FIGS. 10 and 11, an area indicated by the candidate position data CPD is illustrated with an intersection point between a row and is column. However, as described above, a hovering may be generated in an area including at least two rows or at least two columns. Accordingly, the candidate position data CPD may be data with respect to an area including at least two rows or at least two columns.

Also, in FIGS. 10 and 11, a sensing array SARY having a different structure from that of FIG. 2 is illustrated. In the sensing array SARY of FIG. 2, the sensing units SU of the rows R1, R2, . . . , Rn and the columns C1, C2, . . . , Cm may be formed in the same layer, and the sensing of the rows R1, R2, . . . , Rn may be connected one another via jumpers, and the sensing units SU of the columns C1, C2, . . . , Cm may be connected to one another via jumpers. On the other hand, the sensing array SARY of FIG. 10 may be an orthogonal sensing array in which areas where electrodes formed in different layers perpendicularly cross one another operate as sensing units SU. The sensing array SARY may be one of the sensing arrays SARY of FIG. 2 and FIG. 10. Furthermore, the sensing array SARY may have as different structure from that of the sensing array FIG. 2 or FIG. 10.

Referring to FIG. 1 again, the second detection unit 144 removes a ghost from the candidate position data CPD based on the candidate position data CPD detected using the first detection unit 142 to thereby detect touch position data TPD with respect to an actual hovering. The second detection unit 144 may detect the touch position data TPD in a second mode that is different from the first mode. As described above, the first mode may be a single touch mode, and the second touch mode may be a multi-touch mode.

Figure 12:
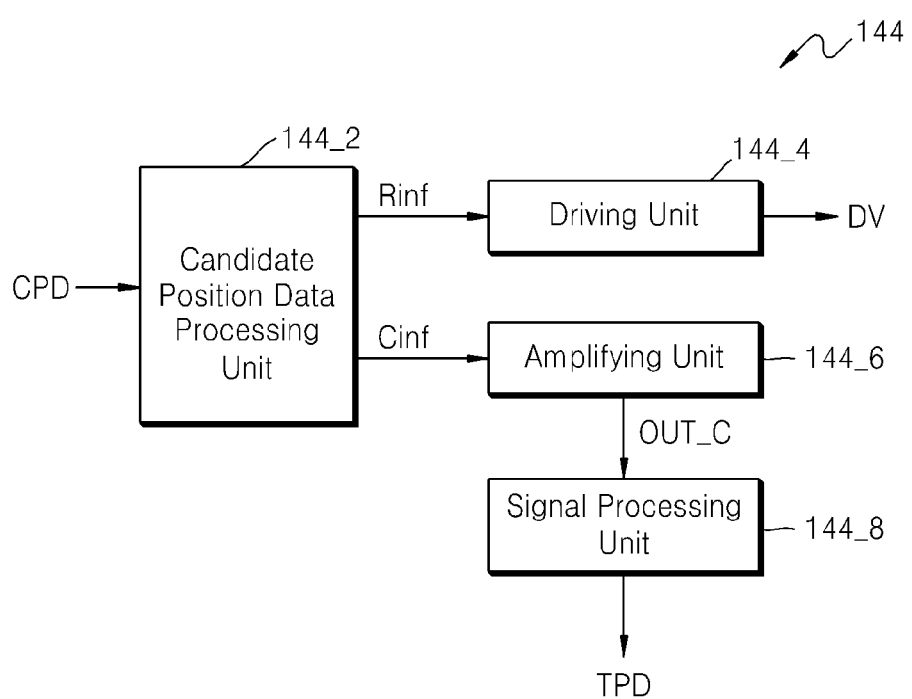
FIGS. 12 and 13A are diagrams to explain a second detection unit of FIG. 1 operating in a multi-touch mode, according to an example embodiment of inventive concepts.
Figure 13A:
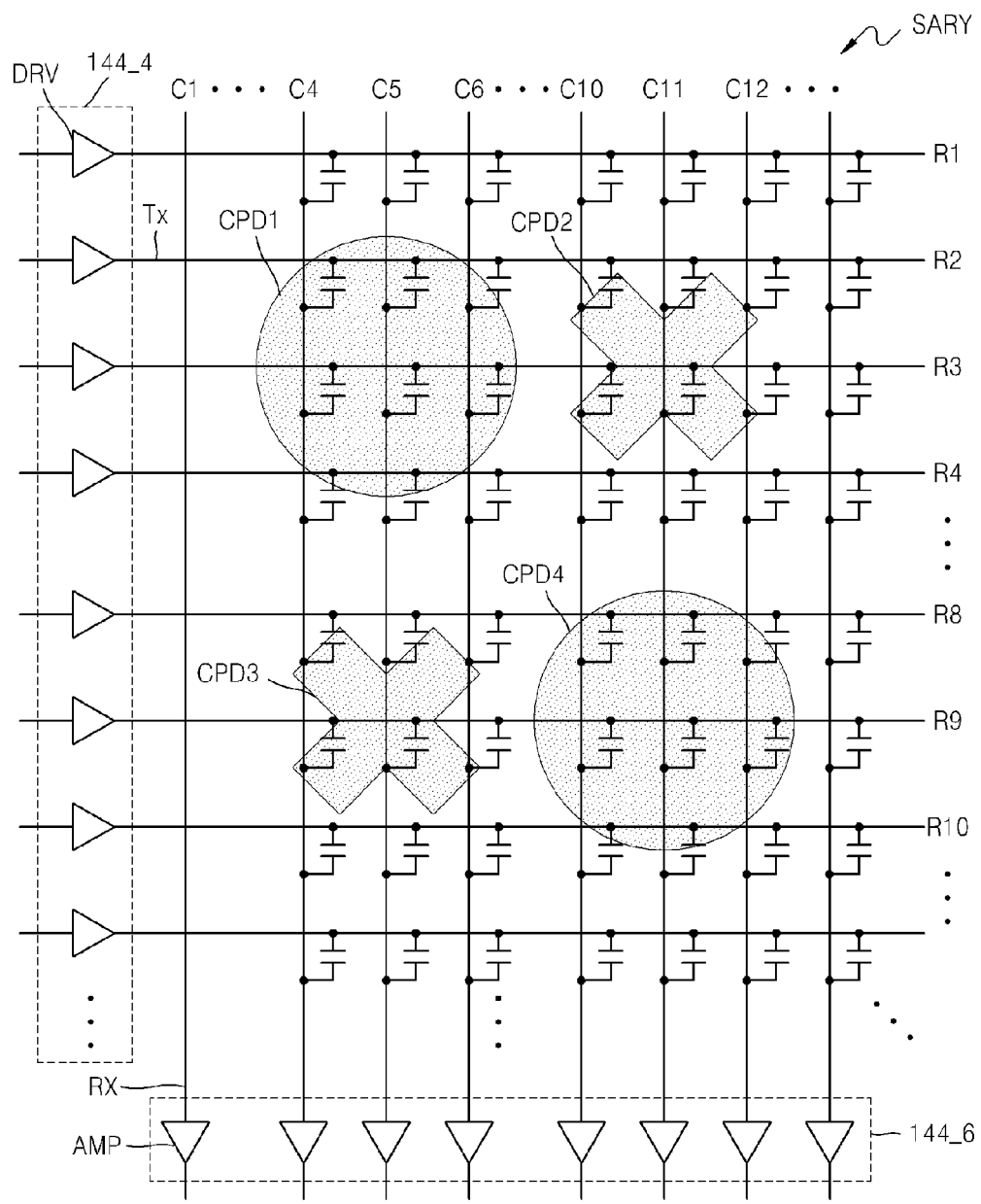

FIGS. 12 and 13A are diagrams to explain the second detection unit 144 of FIG. 1 operating in a multi-touch mode, according to an example embodiment of inventive concepts. Referring to FIGS. 1, 12, and 13A, the second detection unit 144 may include a candidate position data processing unit 144_2, a driving unit 144_4, an amplifying unit 144_6, and a signal processing unit 144_8. The candidate position data processing unit 144_2 may provide the driving unit 144_4 with row information Rinf of the sensing array SARY corresponding to the candidate position data CPD and column information Cinf of the sensing array SARY corresponding to the candidate position data CPD.

Figure 13B:
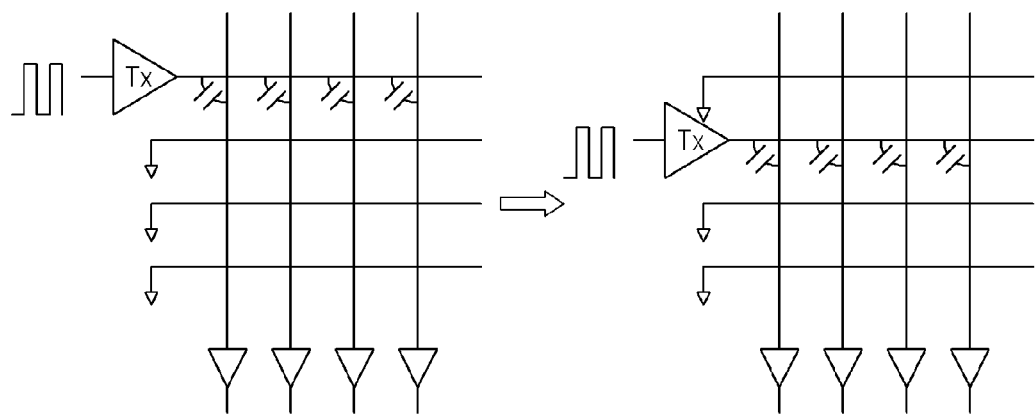
FIGS. 13B and 13C illustrate a sensing operation in the multi-touch mode of FIG. 13A, according to an example embodiment of inventive concepts.

The driving unit 144_4 and the amplifying 144_6 operate in a multi-touch mode. In detail, a driving voltage DV is applied to a row of the sensing array SARY by using the driving unit 144_4, and as change in capacitance caused between a sensing unit SU of a corresponding row and an adjacent sensing unit SU, by the driving voltage DV applied to the row, is transferred to the amplifying unit 144_6 through an arbitrary column of the corresponding row. For example, as illustrated in FIG. 13B, the driving unit 144_4 may be sequentially activated to sequentially scan a row. Intercapacitance between an activated row and each column is detected by using the amplifying unit 144_6. For example, as illustrated in FIG. 13C, as an electrical field is blocked at an intersection point between a row and a column at a position where a hovering is generated, intercapacitance between the activated row and the each column may be reduced, and the amplifying unit 144_6 detects this change.

The driving unit 144_4 may include as plurality of drivers DRV respectively connected to the rows R1, R2, . . . , Rn of the sensing array SARY. The drivers DRV of the driving unit 144_4 may be respectively connected to the rows R1, R2, . . . , Rn through a transmission channel Tx. In response to the row information Rinf, the driving unit 144_4 activates a driver DRV connected to a row corresponding to the candidate position data CPD among the plurality of drivers DRV connected to the row. The activated driver DRV may apply a driving voltage DV to the connected row.

Figure 13C:
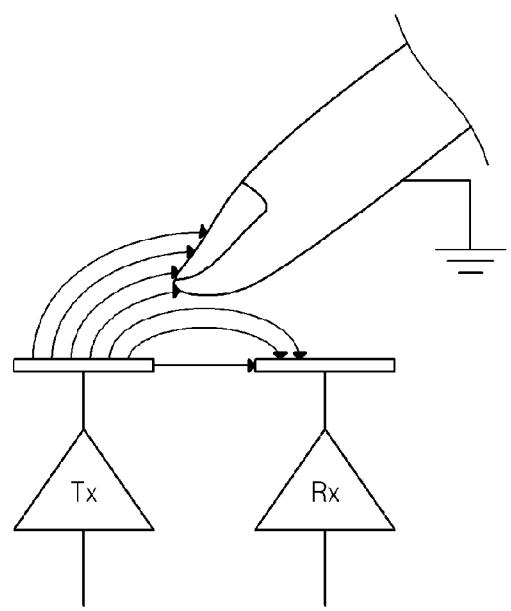

FIGS. 13B and 13C illustrate a sensing operation in the multi-touch mode of FIG. 13A according to example embodiments of inventive concepts.

The amplifying unit 144_6 may include a plurality of amplifying units AMP respectively connected to the columns C1, C2, . . . , Cm of the sensing array SARY. The amplifying units AMP of the amplifying unit 144_6 may be respectively connected to the columns C1, C2, . . . , Cm through a reception channel Rx. In response to the column information Cinf, the amplifying unit 144_6 activates an amplifying unit AMP connected to a column corresponding to the candidate position data CPD among the plurality of amplifying units AMP respectively connected to the columns C1, C2, . . . , Cm of the sensing array SARY. The activated amplifying unit AMP may receive a sensing value SEN from as connected column, and may output an output value OUT_C corresponding to the sensing value SEN. Although not illustrated in FIG. 13A, the amplifying unit 144_6 of FIG. 13A may be a charge amp, as illustrated in FIG. 7A, or may further include a capacitor and a resistor that are connected in parallel between a first input end and an output end of the amplifying unit AMP. Also, although not illustrated in FIG. 13A, like the first detection unit 142 of FIG. 7A, the second detection unit 144 may further include a filter that filters an output value OUT_C of the amplifying unit 144_6 and/or an analog-digital converter that converts an output value OUT_C or a filtered output value OUT_C to digital data.

Hereinafter, an operation of the second detection unit 144 will be described in further detail, by referring to the example embodiment illustrated in FIG. 13A, in which first through fourth candidate position data CPD1 through CPD4 are transmitted from the first detection unit 142 to the second detection unit 144; the first candidate position data CPD1 and the second candidate position data CPD2 respectively denote areas formed by fourth through sixth columns C4 through C6 and tenth through twelfth column C10 through C12 in the second through fourth columns R2 through R4; and the third candidate position data CPD3 and the fourth candidate position data CPD4 respectively denote areas formed by fourth through sixth columns C4 through C6 and tenth through twelfth column C10 through C12 in the eighth through tenth columns R8 through R10.

Figure 14:
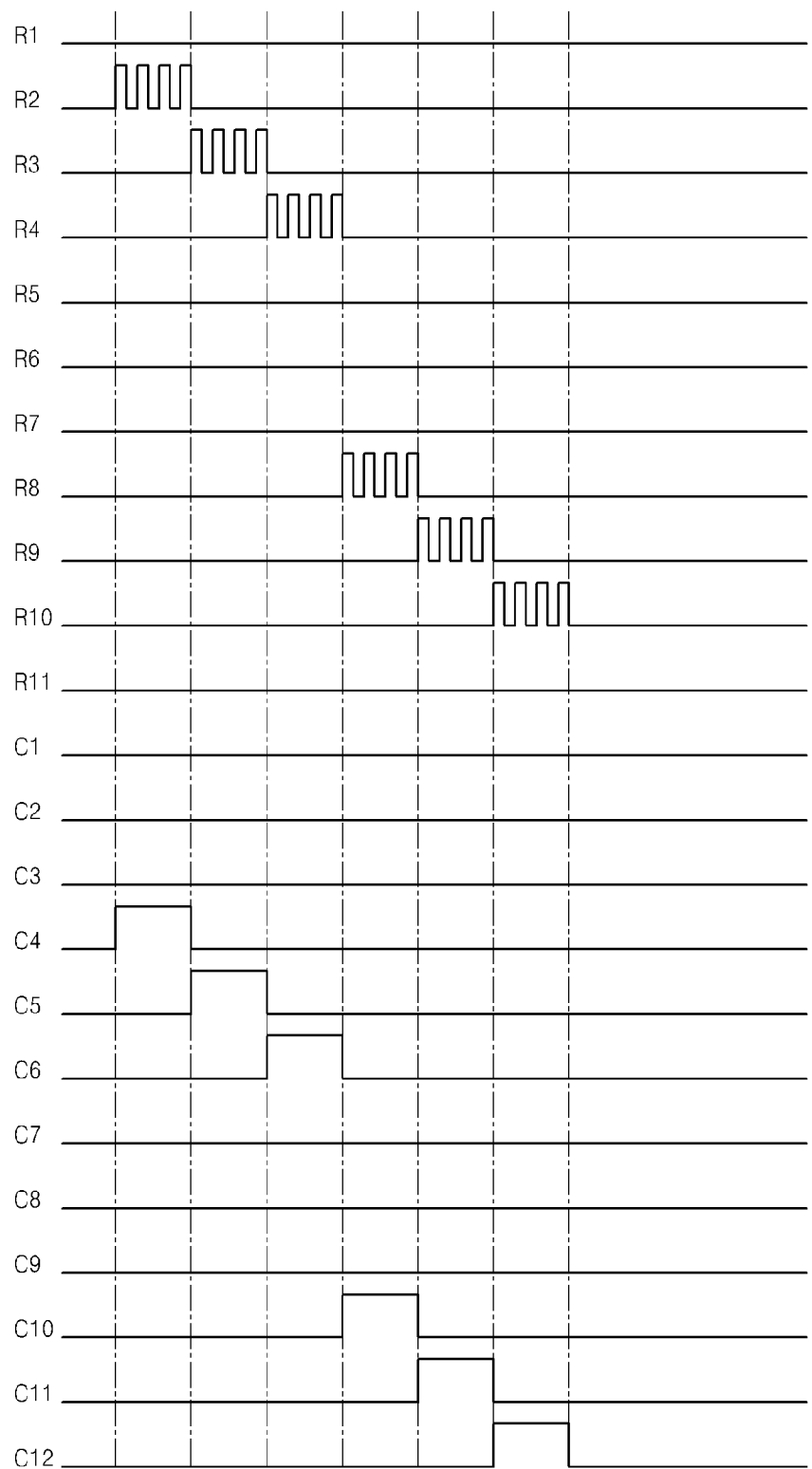
FIG. 14 is a timing diagram illustrating operations of a driving unit and an amplifying unit of the second detection unit of FIG. 1 with respect to candidate position data of FIG. 13A according to an example embodiment of inventive concepts.

FIG. 14 is a timing diagram illustrating operations of a driving unit and an amplifying unit of the second detection 144 unit of FIG. 1 with respect to the candidate position data CPD of FIG. 13A according to an example embodiment of inventive concepts. Referring to FIGS. 12 through 14, the driving unit 144_4 of the second detection unit 144 may sequentially apply a driving voltage DV to the second through fourth rows R2 through R4 and the eighth through tenth rows R8 through R10 in response to row information Rinf received from the candidate position data processing unit 144_2.

For example, after a driver DRV connected to the second row R2 applies a driving voltage DV to the second row R2, a driver DRV connected to the third row R3 may apply a driving voltage DV to the third row R3, and then, a driver DRV connected to the fourth row R4 may apply a driving voltage DV to the fourth row R4. Next, after a driver DRV connected to the eighth row R8 applies a driving voltage DV to the eighth row R8, a driver DRV connected to the ninth row R9 may apply a driving voltage DV to the ninth row R9, and then, a driver DRV connected to the tenth row R10 may apply a driving voltage DV to the tenth row R10.

In response to the column information Cinf received from the candidate position data processing nit 144_2, the amplifying unit 144_6 of the second detection unit 144 may sequentially receive a sensing value SEN from the fourth through sixth columns C4 through C6 and the tenth through twelfth columns C10 through C12. For example, after the amplifying unit AMP connected to the fourth column C4 receives a sensing value SEN from the fourth column C4, and the amplifying unit AMP receives a sensing value SEN from the fifth column C5, the amplifying unit AMP connected to the sixth column C6 may receive a sensing value SEN from the sixth column C6. Next, after the amplifying unit AMP connected to the tenth column C10 receives a sensing value SEN from the tenth column C10, and the amplifying unit AMP connected to the eleventh column C11 receives a sensing value SEN from the eleventh column C11, the amplifying unit AMP connected to the twelfth column C12 may receive a sensing value SEN from the twelfth column C12.

As illustrated in FIG. 14, when a driving voltage DV is sequentially applied to the rows, a period of time during which a driving voltage DV is applied to each row may be represented as a first period TD. Alternatively, as illustrated in FIG. 14, when a sensing value SEN is received from the columns, a period of time during which a sensing value SEN is received with respect to each column may be represented as a first period of time TD.

Referring to FIG. 12 again, the second detection unit 144 may further include a signal processing unit 144_8 that receives an output value OUT_C of the amplifying unit 144_6 to output touch position data TPD. The signal processing unit 144_8 may compare an output value OUT_C with respect to candidate position data CPD indicating the same row or the same row group to select touch position data TPD. The signal processing unit 144_8 of the second detection unit 144 will be described in further detail later.

The touch sensing apparatus 100 may generate candidate position data CPD based on the candidate position data CPD that is sensed in a single (self) touch mode with a good sensing sensitivity, thereby performing an accurate sensing operation with respect to a hovering for which high sensing sensitivity than a contact touch is required. Also, the touch sensing apparatus 100 may sense in a multi-touch mode regarding just the candidate position CPD, thereby reducing power consumption. Hereinafter, the operation of the second detection unit 144 according to various example embodiments of inventive concepts will be described.

Figure 15:
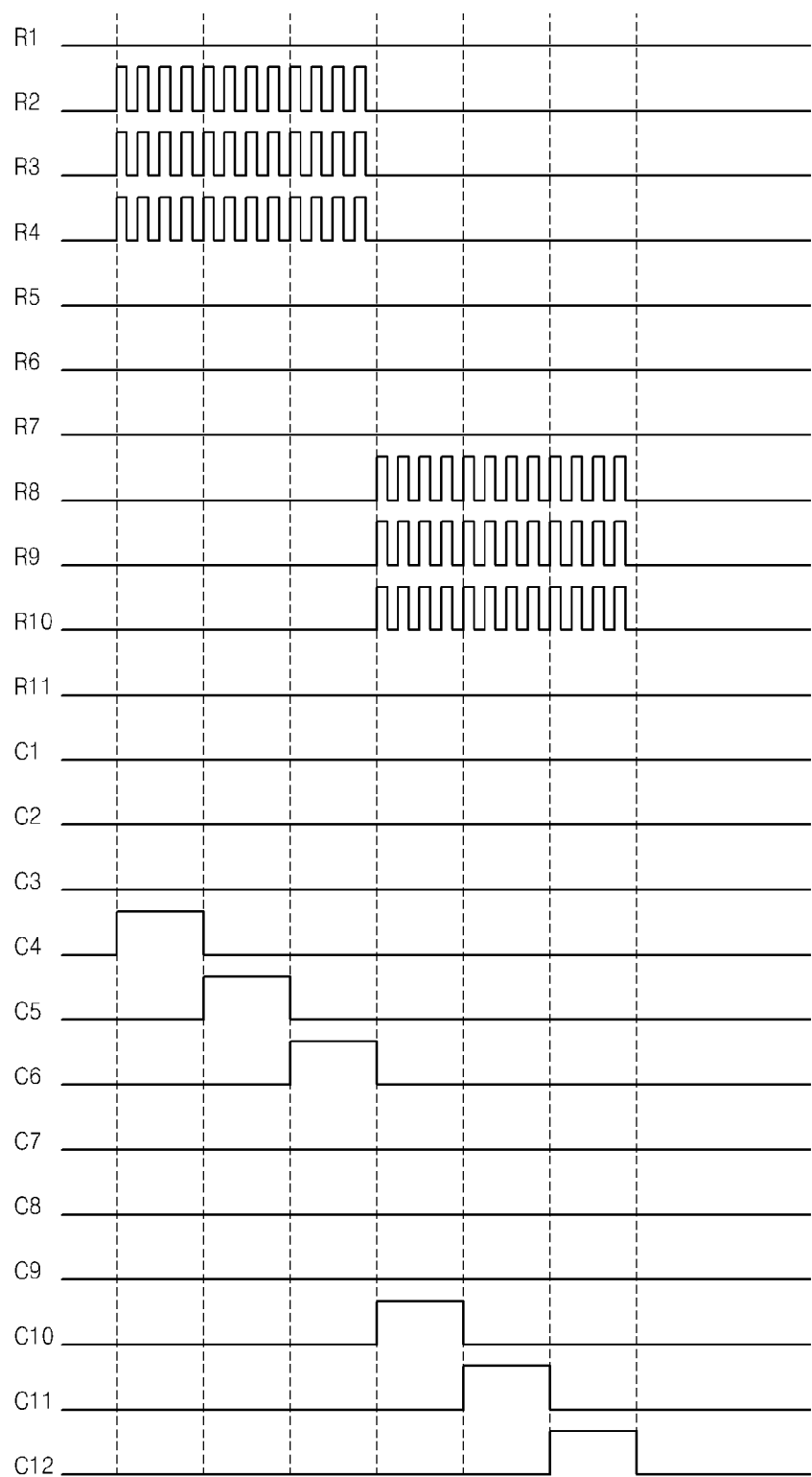
FIG. 15 is a timing diagram illustrating operations of a driving unit and an amplifying unit of the second detection unit of FIG. 1 with respect to candidate position data of FIG. 13A according to another example embodiment of inventive concepts.

FIG. 15 is a timing diagram illustrating operations of a driving unit and an amplifying unit of the second detection unit 144 of FIG. 1 with respect to the candidate position data of FIG. 13A according to another example embodiment of inventive concepts. Referring to FIGS. 12, 13A, and 15, in response to the row information Rinf received from the candidate position data processing unit 144_2, the driving unit 144_4 of the second detection unit 144 may simultaneously apply a driving voltage DV to the second through fourth rows R2 through R4 with respect to first candidate position data CPD1 and second candidate position data CPD2, and then apply a driving voltage DV to the eighth through tenth rows R8 through R10 with respect to the third candidate position data. CPD3 and the fourth candidate position data CPD4.

For example, after the drivers DRV connected to the second through fourth rows R2 through R4 simultaneously apply a driving voltage DV to the second through fourth rows R2 through R4, respectively, the drivers DRV connected to the second through fourth rows R2 through R4 may simultaneously apply a driving voltage DV to the second through fourth rows R4, respectively. Thus, by increasing a period of time for a driving voltage DV applied to each row, the same operating time may be consumed overall, but an accurate sensing operation may be performed at the same time.

A plurality of rows with respect to candidate position data indicating the same rows may be referred to as a row group. For example, the second through fourth rows R2 through R4 with respect to the first candidate position data CPD1 and the second candidate position data CPD2 may be referred to as a first row group (R2-R4), and the eighth through tenth rows R8 through R10 with respect to the third candidate position data CPD3 and the fourth candidate position data CPD4 may be referred to as a second row group (R8-R10).

Furthermore, when referring to FIGS. 12, 13A, and 15, in response to the column information Cinf received from the candidate position data processing unit 144_2, the amplifying unit 144_6 of the second detection unit 144 may sequentially receive a sensing value SEN from the fourth through sixth columns C4 through C6 and from the tenth through twelfth columns C10 through C12. For example, after the amplifying unit AMP connected to the fourth column C4 receives a sensing value SEN from the fourth column C4, and the amplifying unit AMP connected to the fifth column C5 receives a sensing value SEN from the fifth column C5, the amplifying unit AMP connected to the sixth column C6 may receive a sensing value SEN from the sixth column C6. Next, after the amplifying unit AMP connected to the tenth column C10 receives a sensing value SEN from the tenth column C10, and the amplifying unit AMP connected to the eleventh column C11 may receive a sensing value SEN from the eleventh column C11, the amplifying unit AMP connected to the twelfth column C12 may receive a sensing value SEN from the twelfth column C12.

Figure 16:
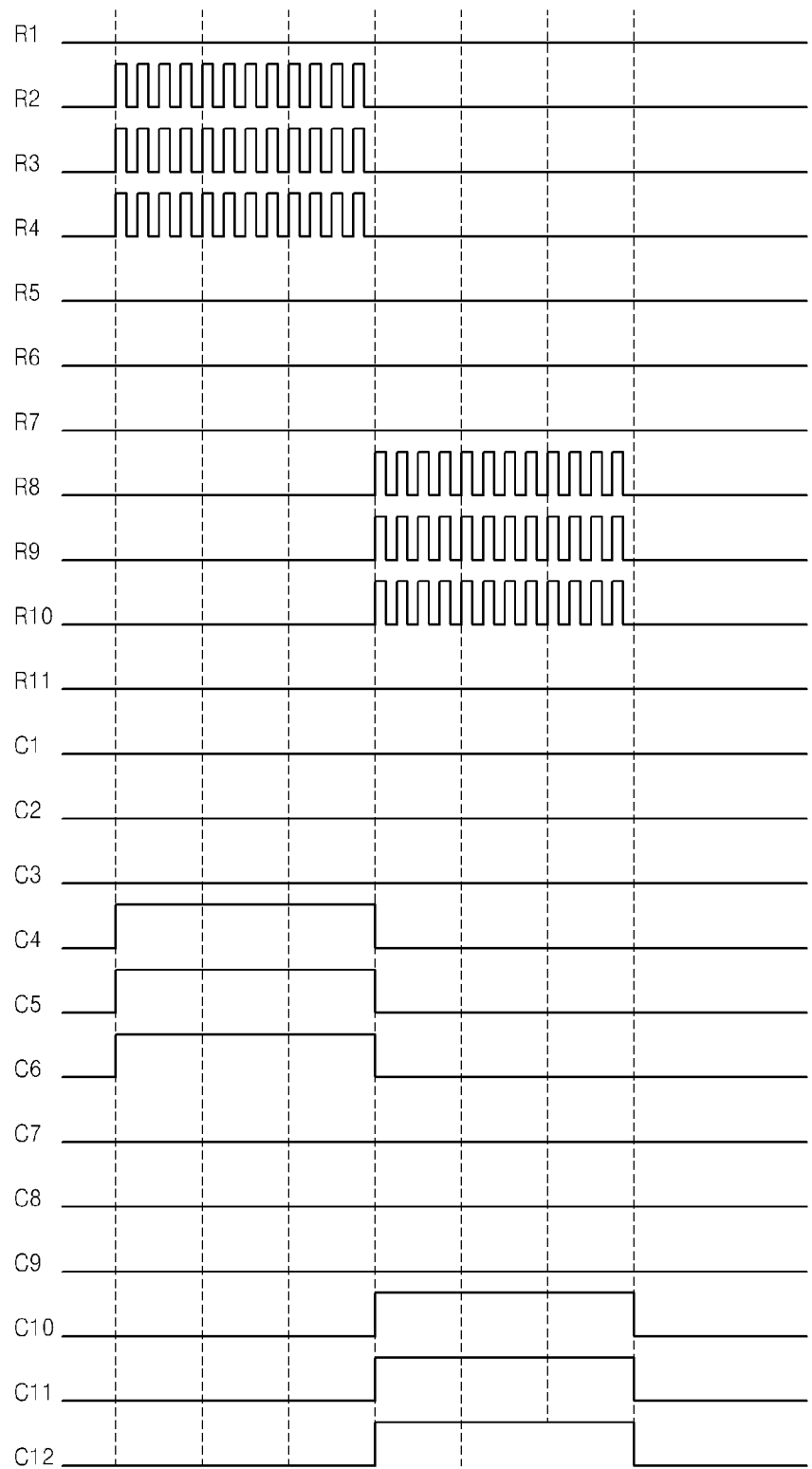
FIG. 16 is a timing diagram illustrating operations of a driving unit and an amplifying unit of the second detection unit of FIG. 1 with respect to candidate position data of FIG. 13A according to another example embodiment of inventive concepts.

FIG. 16 is a timing diagram illustrating operations of a driving unit and an amplifying unit of the second detection unit 144 of FIG. 12 with respect to the candidate position data of FIG. 13A according to another example embodiment a inventive concepts. Referring to FIGS. 12, 13A, and 16, in response to the row information Rinf received from the candidate position data processing unit 144_2, the driving unit 144_4 of the second detection unit 144 may sequentially apply a driving voltage DV to the second through fourth rows R2 through R4 and the eighth through tenth rows R8 through R10.

For example, after the driver DRV connected to the second row R2 applies a driving voltage DV to the second row R2, the driver DRV connected to the third row R3 may apply a driving voltage DV to the third row R3, and then the driver DRV connected to the fourth row R4 may apply a driving voltage DV to the fourth row R4. Next, after the driver DRV connected to the eighth row R8 applies a driving voltage DV to the eighth row R8, the driver DRV connected to the ninth row R9 may apply a driving voltage DV to the ninth row R9, and then the driver DRV connected to the tenth row R10 may apply a driving voltage DV to the tenth row R10.

In response to the column information Cinf received from the candidate position data processing unit 144_2, the amplifying unit 144_6 of the second detection unit 144 may simultaneously receive a sensing value SEN from the fourth through sixth columns C4 through C6 with respect to the first candidate position data CPD1 and the third candidate position data CPD3, and then may simultaneously receive a sensing value SEN from the tenth through twelfth columns C10 through C12 with respect to the second candidate position data CPD2 and the fourth candidate position data CPD4.

For example, after the amplifying unit AMP connected to the tenth through twelfth rows C10 through C12 simultaneously applies a sensing value SEN to the tenth through twelfth rows C10 through C12, respectively, the amplifying unit AMP connected to the tenth through twelfth rows C10 through C12 may simultaneously apply a sensing value SEN to the tenth through twelfth rows C10 through C12. Thus, by increasing a period of time for a sensing value SEN applied to each row, the same operating time may be consumed overall, but an accurate sensing, operation may be performed at the same time.

A plurality of columns with respect to candidate position data indicating the same columns may be referred to as a column group. For example, the fourth through sixth columns C4 through C6 with respect to the first candidate position data CPD1 and the second candidate position data CPD2 may be referred to as a first column group (C4-C6), and the tenth through twelfth columns C10-C12 with respect to the third candidate position data CPD3 and the fourth candidate position data CPD4 may be referred to as a second column group (C10-C12).

Figure 17:
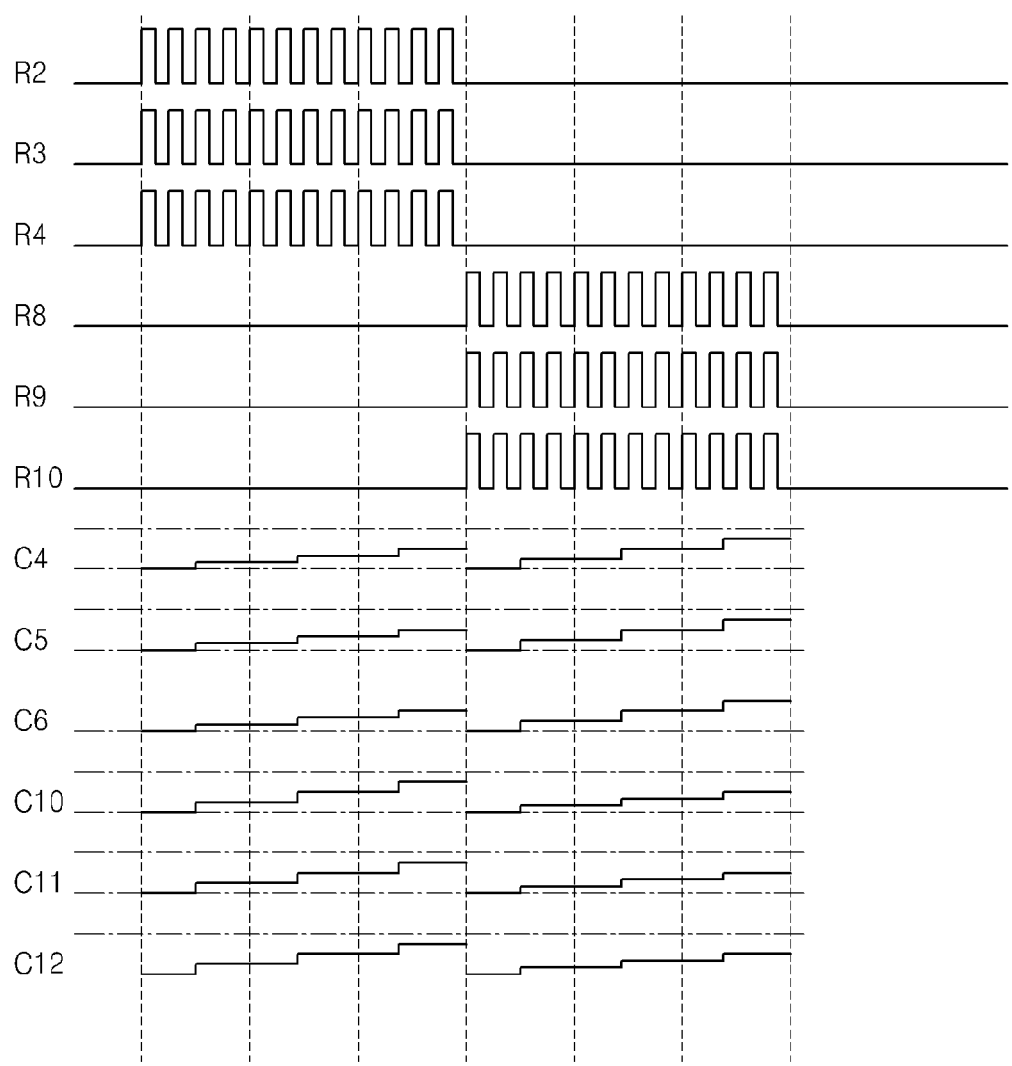
FIG. 17 is a timing diagram illustrating operations of a driving unit and an amplifying unit of the second detection unit of FIG. 1 with respect to candidate position data of FIG. 13A according to another example embodiment of inventive concepts.

FIG. 17 is a timing diagram illustrating operations of a driving unit and an amplifying unit of the second detection unit 144 of FIG. 12 with respect to the candidate position data of FIG. 13A according to another example embodiment of inventive concepts. Referring to FIGS. 12, 13A, and 17, in response to the row information Rinf received front the candidate position data processing unit 144_2, the driving unit 144_4 of the second detection unit 144 may simultaneously apply a driving voltage DV to the second through fourth rows R2 through R4 with respect to the first candidate position data CPD1 and the second candidate position data CPD2, and then may simultaneously apply a driving voltage DV to the eighth through tenth rows R8 through R10 with respect to the third candidate position data CPD3 and the fourth candidate position data CPD4.

For example, after the drivers DRV respectively connected to the second through fourth rows R2 through R4 simultaneously apply a driving voltage DV to the second through fourth rows R2 through R4, the drivers DRV connected to the second through fourth rows R2 through R4 may simultaneously apply a driving voltage DV to the second through fourth rows R4.

In response to the column information Cinf received from the candidate position data processing unit 144_2, the amplifying unit 144_6 of the second detection unit 144 may receive a sensing value SEN that is accumulated during a period corresponding to the number of columns included in each column group. For example, the amplifying unit 144_6 may receive a sensing value SEN from the first column group (C4 through C6) during three periods TD, and then may receive a sensing value SEN from the second column group (C10 through C12) during (another) three periods TD. The amplifying units AMP of the first column group (C4 through C6) may sequentially or simultaneously receive a sensing value SEN from a connected column, and the amplifying units AMP of the second column group (C10 through C12) may sequentially or simultaneously receive a sensing value SEN from a connected column. Thus, by accumulating the sensing values SEN received from the columns, a more accurate sensing operation may be performed for the same amount of time and using the same resources.

While an example embodiment in which the second detection unit 144 simultaneously activates only an amplifying unit with respect to some of the columns indicated by the candidate position data CPD is described, the amplifying unit with respect to all columns indicated by the candidate position data CPD may also be simultaneously activated.

Figure 18:
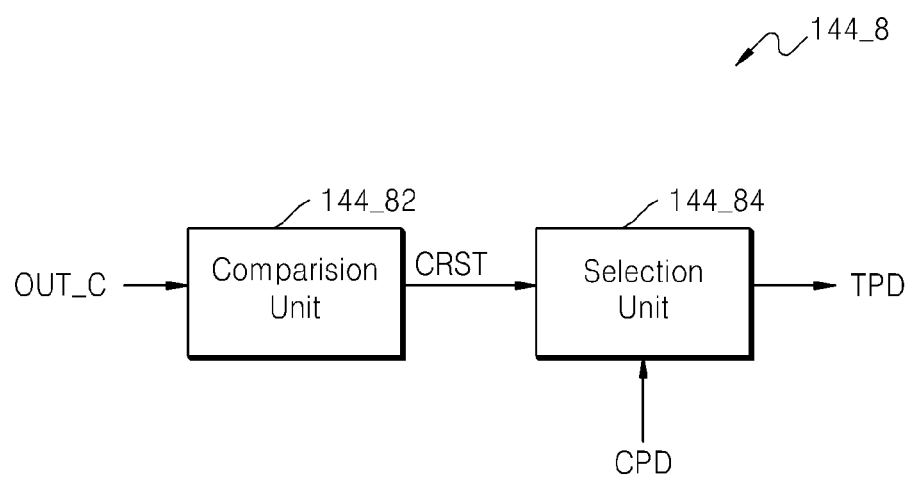
FIG. 18 illustrates a signal processing unit of the second detection unit of FIG. 12 according to an example embodiment of inventive concepts.
Figure 19:
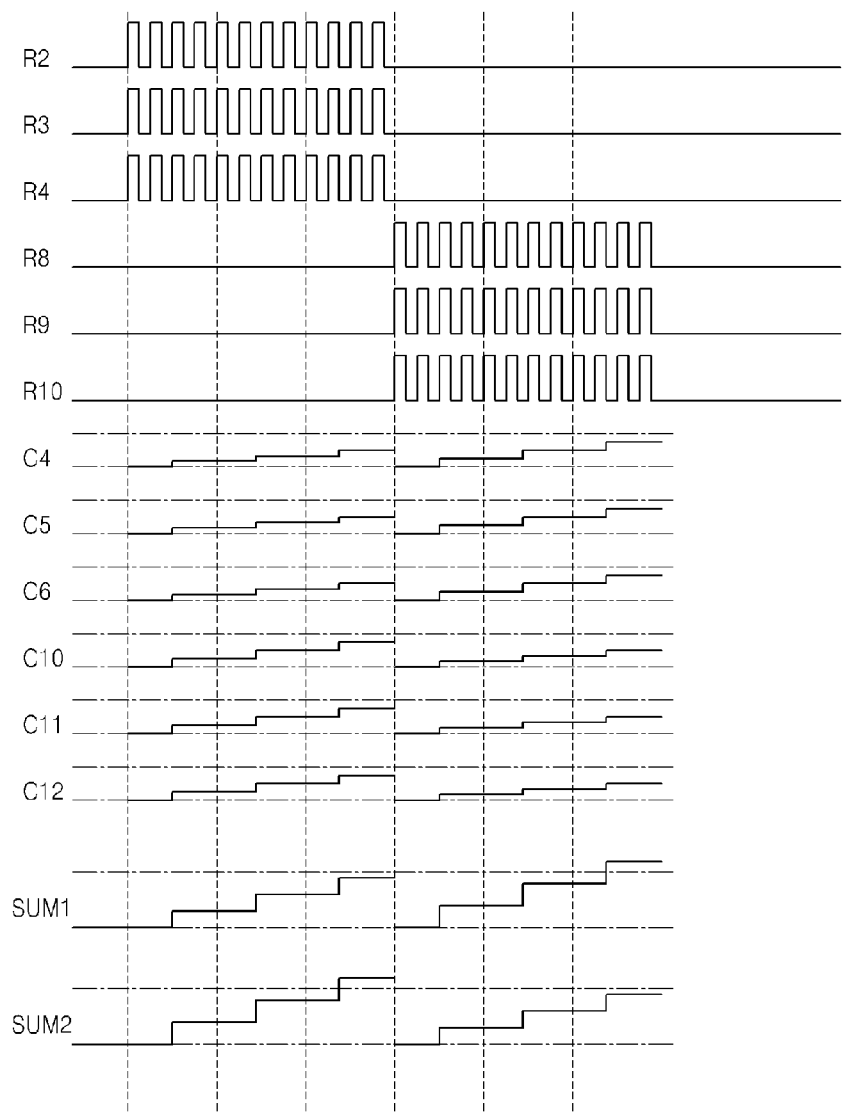
FIG. 19 is a diagram to explain an operation of the signal processing unit of FIG. 18 according to an example embodiment of inventive concepts.

FIG. 18 illustrates a signal processing unit 144_8 of the second detection unit 144 of FIG. 12 according to an example embodiment of inventive concepts. FIG. 19 is a diagram to explain art operation of the signal processing unit 144_8 of FIG. 18 according to an embodiment of the inventive concept. First, referring to FIGS. 12 and 18, as described above, the signal processing unit 144_8 may compare an output value OUT_C with respect to candidate position data CPD indicating the same row or the same row group to select touch position data TPD. To this end, the signal processing unit 144_8 may include a comparing unit 144_82 and a selecting unit 144_84.

The comparing unit 144_82 may perform a comparing operation by receiving an output value OUT_C with respect to candidate position data CPD indicating the same row or the same row group. In regard to the example of FIG. 13A, the comparing unit 144_82 may compare output values OUT_C with respect to the first candidate position data CPD1 and the second candidate position data CPD2 indicating the second through fourth rows R2 through R4. The output value OUT_C with respect to the first candidate position data CPD1 may be a sum SUM1 of output values OUT_C of the fourth through sixth columns C4 through C6 represented by the first candidate position data CPD1. Likewise, the output value OUT_C with respect to the second candidate position data CPD2 may be a sum SUM1 of output values OUT_C of the tenth through twelfth columns C10 through C12 represented by the second candidate position data CPD2.

Referring to FIG. 19, the output value OUT_C with respect to the first candidate position data CPD1 may be a first value VAL1, and the output value OUT_C with respect to the second candidate value CPD2 may be a second value VAL2. While FIG. 19 illustrates an operation of the signal processing unit 144_8 regarding the example of the second detection unit 144, the second detection unit 144 may also operate in the same manner with respect to FIGS. 14 through 16 or the like.

Also, with respect to the example of FIG. 13A, the comparing unit 144_82 compares output values OUT_C with respect to the third candidate position data CPD3 and the fourth candidate position data CPD4 indicating the eighth through tenth rows R8 through R10. The output value OUT_C with respect to the fourth candidate position data. CPD4 may be a sum SUM2 of output values OUT_C of the fourth through sixth columns C4 through C6 indicated by the third candidate position data CPD3. Likewise, the output value OUT_C with respect to the fourth candidate position data CPD4 may be a sum SUM2 of the tenth through twelfth C10 through C12 represented by the fourth candidate position data CPD4. Referring to FIG. 19, the output value OUT_C with respect to the third candidate position data CPD3 may be a third value VAL3, and the output value OUT_C with respect to the fourth candidate value CPD4 may be a fourth value VAL4.

The comparing unit 144_82 may compare the first value VAL1 and the second value VAL2 and compare the third value VAL3 and the fourth value VAL4 to output a comparison result CRST. With respect to the example of FIG. 19, the comparing unit 144_82 may output a comparison result CRST indicating that the second value VAL2 is greater than the first value VAL1 and the third value VAL3 is greater than the fourth value VAL4.

In response to the comparison result CRST, the selecting unit 144_84 may select touch position data TPD indicating a position of an actually generated hovering from the candidate position data CPD. For example, based on the comparison result CRST indicating that the second value VAL2 is greater than the first value VAL1, the selecting unit 144_84 may select the first candidate position data CPD1, from among the first candidate position data CPD1 and the second candidate position data CPD2, as the touch position data TPD. Also, based on the comparison result CRST indicating that the third value VAL3 is greater than the fourth value VAL3, the selecting unit 144_84 may select the third candidate position data CPD3, from among the third candidate position data CPD3 and the fourth candidate position data CPD4, as the touch position data TPD.

As described above, as a magnetic field generated between the two electrodes of FIG. 3 decreases by a hovering or a contact touch, a charge amount in a column where the hovering or the contact touch is generated may decrease. Accordingly, an output value of the column in which the hovering or the contact touch is generated may be smaller than an output value of a column where a hovering or a contact touch is not generated.

Above described is the operation of the second detection unit 144 of FIG. 12 with respect to the candidate position data CPD of FIG. 13A. Here, the candidate position data CPD of FIG. 13A, that is, the first through fourth candidate position data CPD1 through CPD4 are data with respect to an area of the same size. In other words, the first through fourth candidate position data CPD1 through CPD4 of FIG. 13A represent data about an intersection area having the same number of rows and the same number of columns. However, the embodiments of the inventive concept are not limited thereto.

Figure 20:
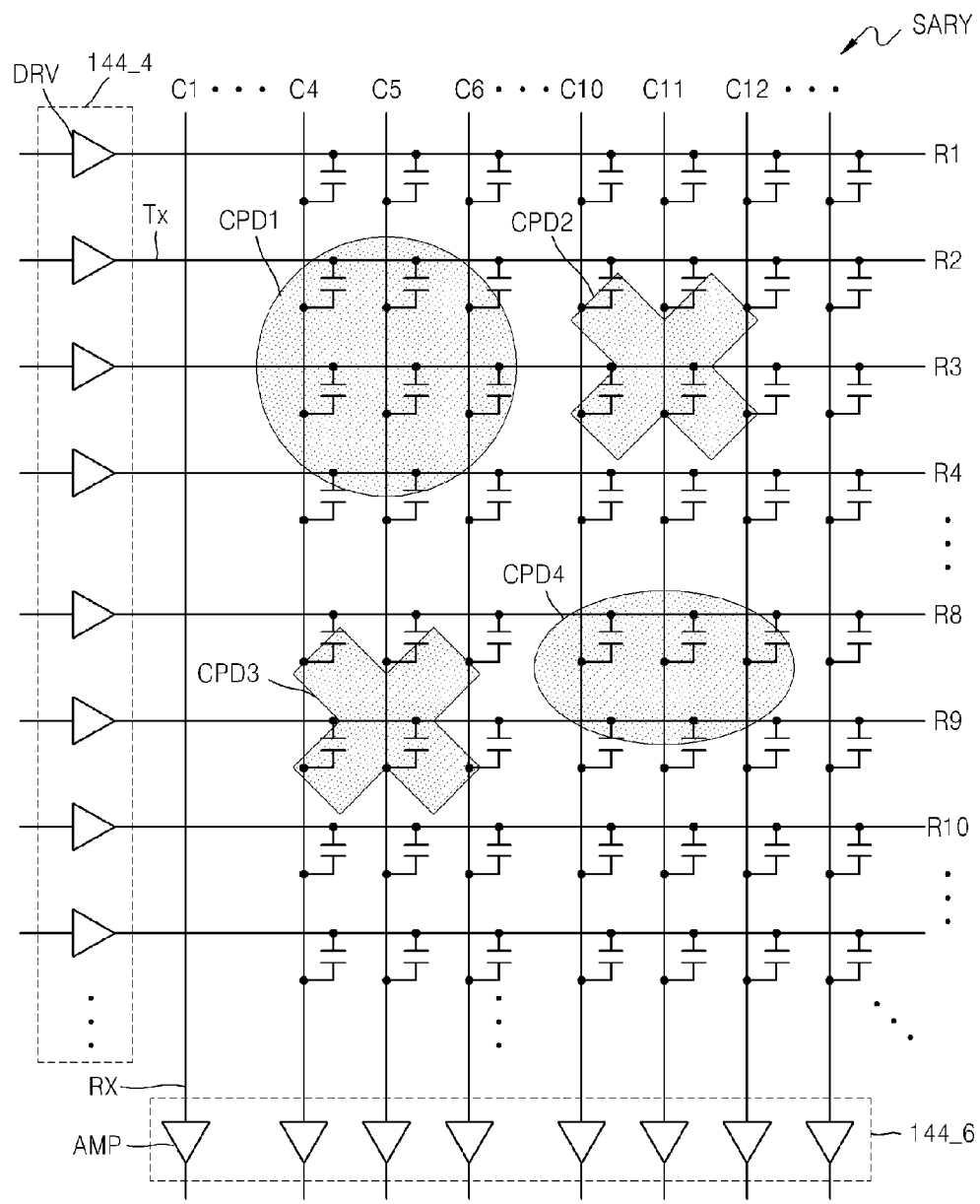
FIG. 20 illustrates candidate position data that is different from that of FIG. 13A, according to another example embodiment of inventive concepts.

FIG. 20 illustrates candidate position data different from that of FIG. 13A, according to another example embodiment of inventive concepts. Referring to FIGS. 1 and 20, the first through fourth candidate position data CPD1 through CPD4 may respectively represent data regarding different areas. For example, in FIG. 20, the first candidate position data CPD1 may be data representing an intersection area of three rows (second through fourth rows R2 through R4) and three columns (fourth through sixth columns C4 through C6), whereas the fourth candidate position data CPD4 may be data representing an intersection area of two rows (eighth and ninth rows R8 and R9) and three columns (tenth through twelfth columns C10 through C12).

The intersection areas above may be varied according to a difference in surface areas of hoverings that are generated at a distance perpendicularly spaced apart from the touch screen panel 120, for example, according to a difference in surface areas of hoverings according to an inclination between the fingers of a person who performs a hovering and the touch screen panel 120. Also, in regard to candidate position data with respect to a ghost, candidate position data with respect to an actual hovering and an area indicating the data may vary in size due to, for example, a detection capability of the first detection unit 142.

Figure 21:
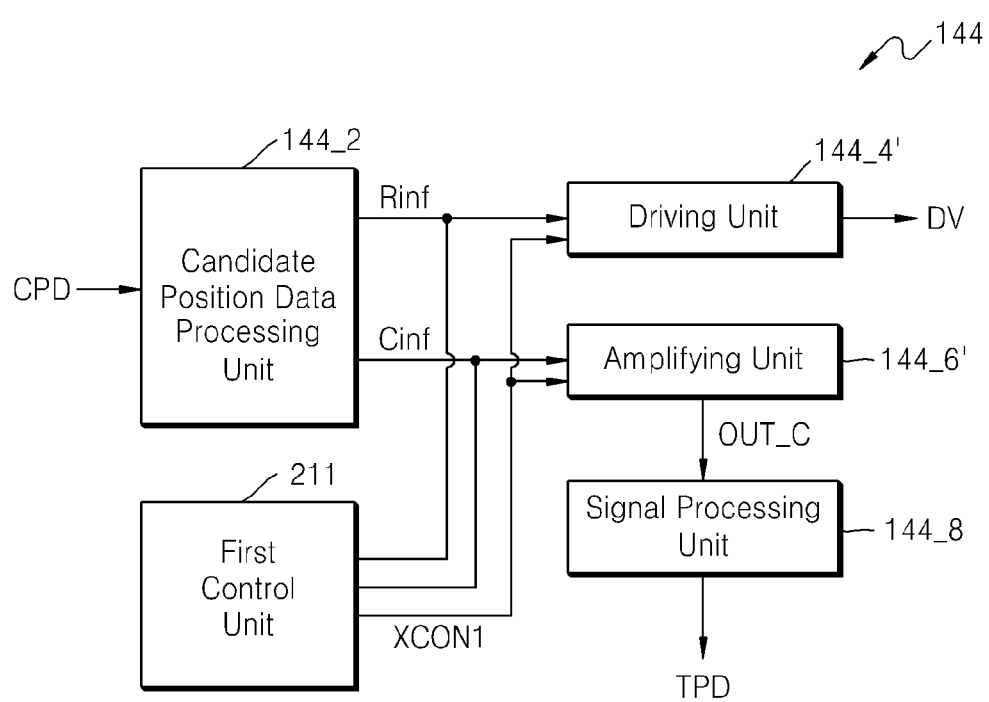
FIG. 21 illustrates a second detection unit that is adaptive to the candidate position data of FIG. 20, according to an example embodiment of inventive concepts.

FIG. 21 illustrates a second detection unit 144 that is adaptive to the candidate position data of FIG. 20, according to an example embodiment of inventive concepts. Referring to FIGS. 20 and 21, the second detection unit 144 of FIG. 21 may include, like the second detection unit 144 of FIG. 12, the candidate position data processing unit 144_2, a driving unit 144_4', amplifying unit 144_6', and a signal processing unit 144_8. The candidate position data processing unit 144_2 receives candidate position data CPD front the first detection unit 142. Also, the candidate position data processing unit 144_2 may provide the driving unit 144_4' with row information Rinf of the sensing array SARY corresponding to the candidate position data CPD and column information Cinf of the sensing array SARY corresponding to the candidate position data CPD. The driving unit 144_4' and the amplifying unit 144_6' operate in a multi-touch mode. In detail, a driving voltage DV is applied to a row of the sensing array SARY by using the driving unit 144_4', and a change in capacitance, which is generated between the sensing unit SU of the corresponding row and an adjacent sensing unit SU, by the driving voltage DV applied to the row, is transferred to the amplifying unit 144_6' through a column of the corresponding row.

Furthermore, the second detection unit 144 of FIG. 21 may further include a first control unit 211. The first control unit 211 may receive row information Rinf and column information Cinf from the candidate position data processing unit 144_2 to thereby determine a size of an area represented by each piece of candidate position data CPD, that is, the number of rows and the number of columns. The first control unit 211 generates a first control signal based on the number of rows or the number of columns indicated by each piece of candidate position data CPD. The first control signal XCON1 is transmitted to the driving unit 144_4' or the amplifying unit 144_6'.

In response to the first control signal XCON1 the driving unit 144_4' or the amplifying, unit 144_6' may perform an additional driving or amplifying operation with respect to each piece of candidate position data CPD. For example, in response to the first control signal XCON1, the driving unit 144_4' or the amplifying unit 144_6' may vary the number of rows or columns that are simultaneously activated as illustrated in FIG. 15 or 16, according to a size of an area represented by each piece of candidate position data CPD. Alternatively, for example, the amplifying unit 144_6' may vary a period in which the sensing value SEN is accumulated, as illustrated in FIG. 17, according to as size of an area represented by each piece of candidate position data CPD.

Above described is an example embodiment in which the first detection unit 142 and the second detection unit 144 are implemented as separate circuits. However, this structure is merely provided to clearly describe the concept of the operation of the touch controller 140 according to inventive concepts. That is, each of the rows R1, R2, . . . , Rn and each of the columns C1, C2, . . . , Cm of the sensing array SARY of FIG. 13A may be in any structure in which the operation of the first detection unit 142 of FIG. 7A and the operation of the second detection unit 144 of FIG. 7A may be selectively performed.

Figure 22:
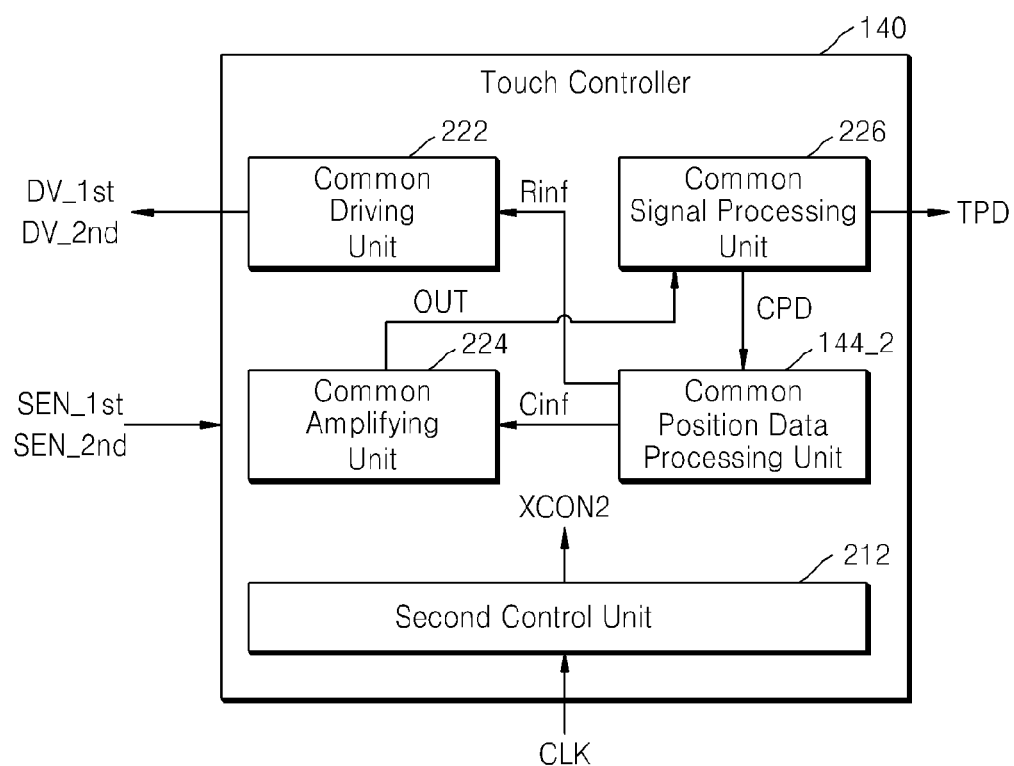
FIG. 22 illustrates a touch controller 140 having a structure in which the first detection unit and the second detection unit of FIG. 1 are commonly included.
Figure 23:
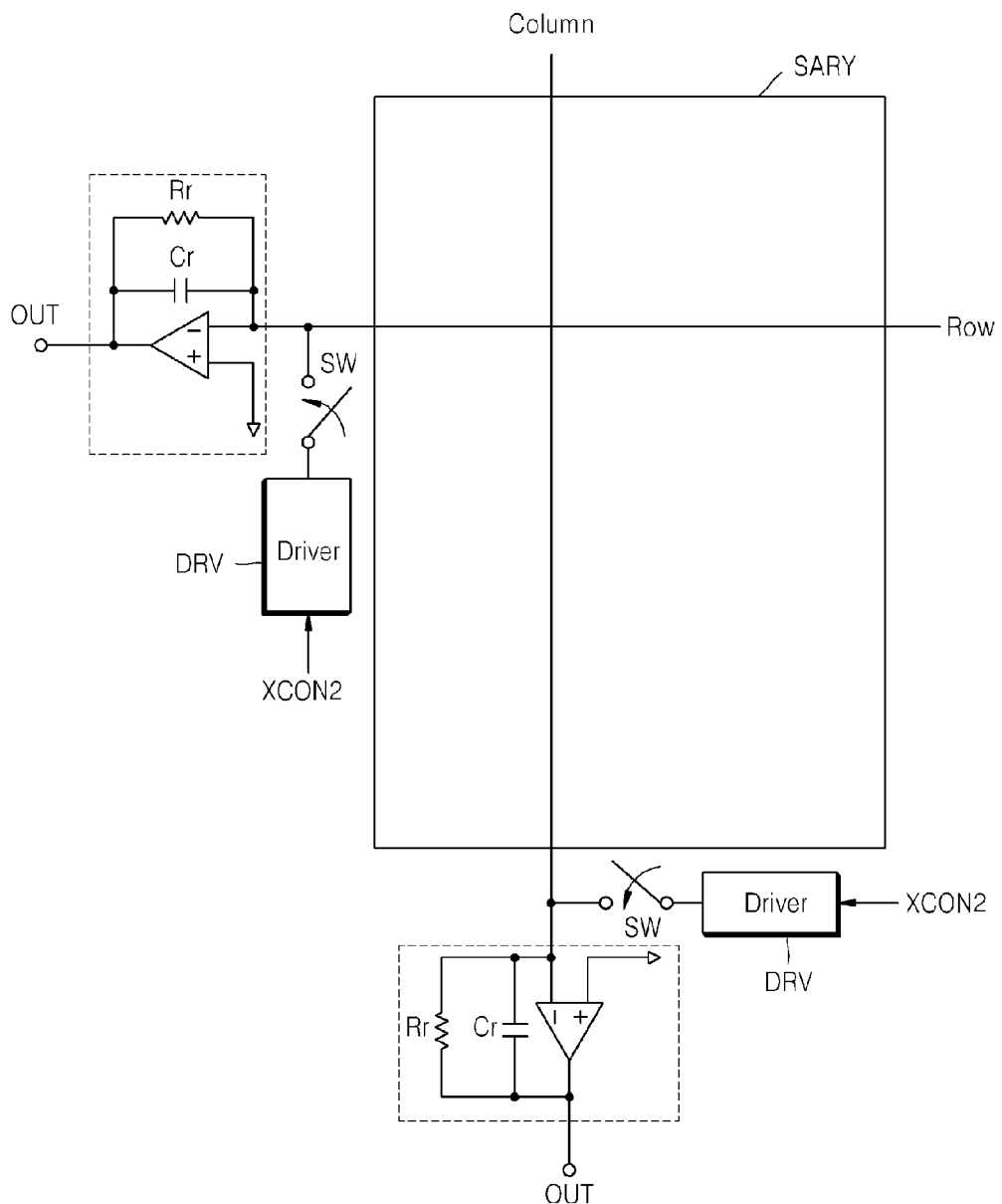
FIG. 23 is a detailed view illustrating a driving unit and an amplifying unit of FIG. 22, according to an example embodiment of inventive concepts.

FIG. 22 illustrates a touch controller 140 having a structure in which the first detection unit and the second detection unit of FIG. 1 are commonly included. FIG. 23 is a detailed view illustrating as driving unit and an amplifying unit of FIG. 22. Referring to FIGS. 22 and 23, the touch controller 140 may include a second control unit 212, a common driving unit 222, a common amplifying unit 224, a common signal processing unit 226, and a candidate position data processing unit 144_2. In response to a clock signal CLK, the second control unit 212 may generate a second control signal XCON2 through which the common driving unit 222, the common amplifying unit 224, and the common signal processing unit 226 are controlled.

For example, the second control unit 212 may generate a second control signal XCON2 so that the touch controller 140 operates like the first detection unit 142 of FIG. 1 in a first period of the clock signal CLK. For example, the second control unit 212 may control the common driving unit 222, the common amplifying unit 224, and the common signal processing unit 226 so that they operate in a first mode (e.g., a single touch mode) in a first section of the clock signal CLK to thereby generate candidate position data CPD. Also, the second control unit 212 may generate a second control signal XCON2 so that the touch controller 140 operates like the second detection unit 144 of FIG. 1 in a second section of the clock signal CLK. For example, the second control unit 212 may control the common driving unit 222, the common amplifying unit 224, and the common signal processing unit 226 so that they operate in a second mode (e.g., a multi-touch model with respect to candidate position data CPD in the second section of the clock signal CLK to thereby generate touch position data TPD.

The first and second sections of the clock signal CLK may be set such that they are alternately generated. The first and second sections of the clock signal CLK may be set at different times.

As illustrated in FIG. 23, the common driving unit 222 and the common amplifying unit 224 may be respectively connected to each row and each column of the sensing array SARY. The common driving unit 222 outputs a primary driving voltage $DV\_1^{st}$ regarding a single touch mode and a secondary driving voltage $DV\_2^{nd}$ regarding a multi-touch mode in regard to processing touch position data TPD with respect to concurrently generated multiple hoverings. In regard to processing touch position data TPD with respect to concurrently generated multiple hoverings, the common amplifying unit 224 receives a primary sensing value $SEN\_1^{st}$ with respect to a single touch mode and a secondary sensing value $SEN\_2^{nd}$ with respect to a multi-touch mode. A detailed structure and a detailed operation of the common driving unit. 222 and the common amplifying unit 224 are similar to those of FIG. 7A or FIG. 13A described above, and thus description thereof is omitted. The difference is simply that in order for the touch controller 140 to perform an operation of the second detection unit 144 described above, the common amplifying unit 224 connected to each row and the common driving unit 222 connected to each column may be inactivated in response to the second control signal XCON2.

In response to the second control signal XCON2, the common signal processing unit 226 may output candidate position data CPD in the same manner as the first detection unit 142 described above, in the first section of a clock signal CLK. Also, in response to the second control signal XCON2, the common signal processing unit 226 may output touch position data TPD in the same manner as the second detection unit 144 in the second section of the clock signal CLK.

Above described is a touch screen panel that processes multi-hovering, that is, a plurality of hoverings. However, as described above, a single hovering may also be generated with respect to the touch screen panel 120. This will be described below.

Figure 24:
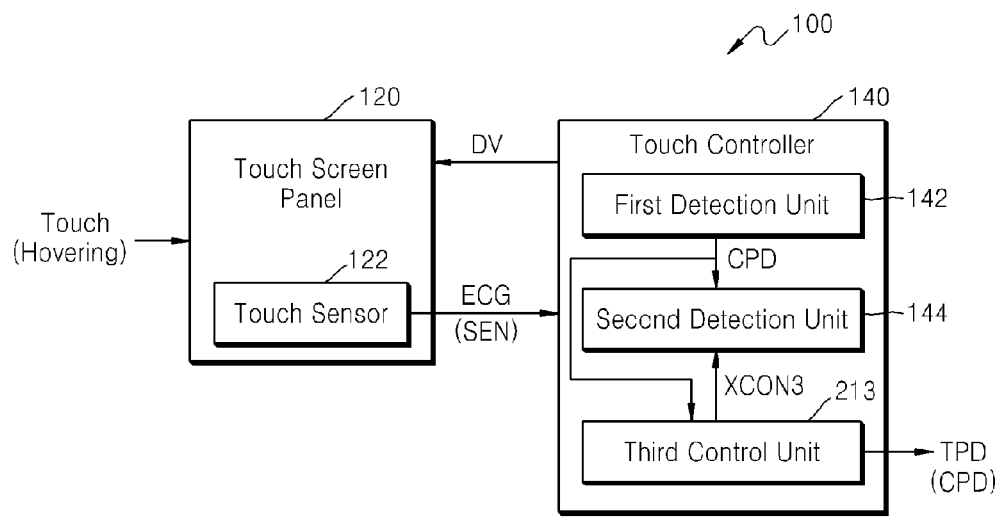
FIG. 24 illustrates the touch controller of FIG. 1 according to another example embodiment of inventive concepts.

FIG. 24 illustrates the touch controller 140 of FIG. 1 according to another example embodiment of inventive concepts. Referring to FIG. 24, the touch controller 140 may include a first detection unit 142, a second detection unit 144, and a third control unit 213. When at least two hoverings are generated with respect to the touch screen panel 120, the first detection unit 142 detects an electrical change ECG of the touch sensor 122 in a first mode as multiple pieces of candidate position data CPD with respect to each hovering. The second detection unit 144 may detect an electrical change in an area of the touch sensor 122 corresponding to multiple pieces of candidate position data CPD in a second mode that is different from the first mode to thereby select touch position data TPD with respect to at least two hoverings from among the multiple pieces of the candidate position data CPD. As described above, the first mode may be a single touch mode with a higher sensing sensitivity with respect to a hovering than the second mode, and the second mode may be a multi-touch mode in which a large number of touches may be sensed at a time, that is, multiple concurrent touches may be sensed. This applies also below.

The third control unit 213 may count the number of pieces of candidate position data CPD generated by using the first detection unit 142, and if the is one piece of candidate position data CPD, the third control unit 213 may generate a third control signal XCON3. The second detection unit 144 may be inactivated in response to the third control signal XCON3. Also, if a single hovering is generated, the third control unit 213 does not have to remove a ghost, and thus the third control unit 213 may output candidate position data CPD as touch position data TPD. As described above, the first detection unit 142 and the second detection unit 144 of the touch controller 140 are simply distinguished by functions and may not be physically separated. This also applies to the third control unit 213.

Above described is the touch controller 140 that processes a hovering. However, example embodiments of the inventive concept are not limited thereto. The touch sensing device 100 may also process a contact touch. This will be described below.

Figure 25:
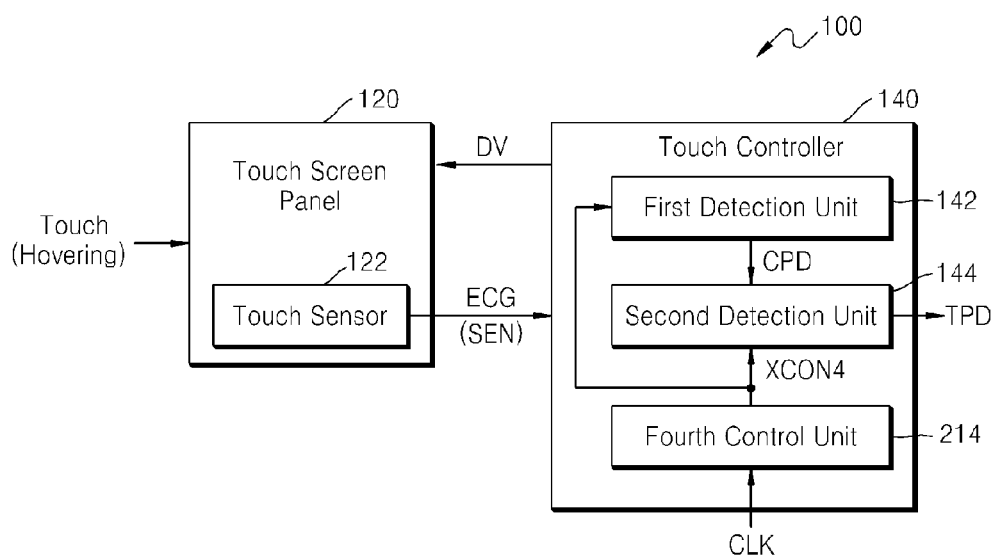
FIG. 25 illustrates the touch sensor of FIG. 1 according to another example embodiment of inventive concepts.

FIG. 2 illustrates the touch sensor 122 of FIG. 1 according to another embodiment of the inventive concept. Referring to FIG. 25, the touch controller 140 may include a first detection unit 142, a second detection unit 144, and a fourth control unit 214. When at least two hoverings are generated with respect to the touch screen panel 120, the first detection unit 142 detects an electrical change ECG of the touch sensor 122 in a single touch mode as multiple pieces of candidate position data CPD with respect to the respective hoverings. The second detection unit 144 may detect an electrical change in an area of the touch sensor 122 corresponding to the multiple pieces of candidate position data CPD in a multi-touch mode to thereby select touch position data TPD with respect to at least two hoverings from among the multiple pieces of candidate position data CPD.

The fourth control unit 214 may determine whether a touch generated in the touch screen panel 120 is as hovering or a contact touch to thereby generate a fourth control signal XCON4. For example, when a sensing value SEN sensed using the touch sensor 122 is equal to or greater than a first size, the fourth control unit 214 may determine that a hovering is generated, and generate a fourth control signal XCON4 as a first value. On the other hand, when a sensing value SEN sensed using the touch sensor 122 is smaller than the first size, the fourth control unit 214 may determine that a contact touch is generated, and generate a fourth control signal XCON4 as a second value. As an electrical change by a hovering and by a contact touch varies (for example, a change in a magnetic field of FIG. 3 by a hovering is smaller than that by a contact touch), in the case of a hovering or a contact touch, the first size may be set based on a statistical value of the sensing value SEN.

The first detection unit 142 and the second detection unit 144 may each generate candidate position data CPD described above and touch position data TPD based on the candidate position data CPD in response to the fourth control value XCON4 of the first value. On the other hand, the first detection unit 142 may be inactivated in response to the fourth control signal XCON4 of the second value. Also, in response to the fourth control signal XCON4 of the second value, the second detection unit 144 may apply a driving voltage DV to all rows R1, R2, . . . , Rn of the sensing array SARY and receive a sensing value SEN from all columns C1, C2, . . . , Cm of the sensing array SARY.

That is, in response to the fourth control signal XCON4 of the second value, when a contact touch is generated, the second detection unit 144 may immediately generate touch position data TPD with respect to a contact touch in a multi-touch mode without generating candidate position data CPD. Since a sensing sensitivity required for a contact touch is relatively low compared to a hovering, a single touch mode with a high sensing sensitivity required with respect to a hovering may not have to be performed. Thus, sensing may be immediately performed in a multi-touch mode for a contact touch in order to reduce power consumption.

As described above, the first detection unit 142 and the second detection unit 144 of the touch controller 140 may be merely distinguished according to functions as described above, and may not be physically separated. The same applies to the fourth control unit 214. For example, the fourth control unit 214 may share a physical structure of the second detection unit 144 to receive a sensing value SEN front the touch screen panel 120.

Figure 26:
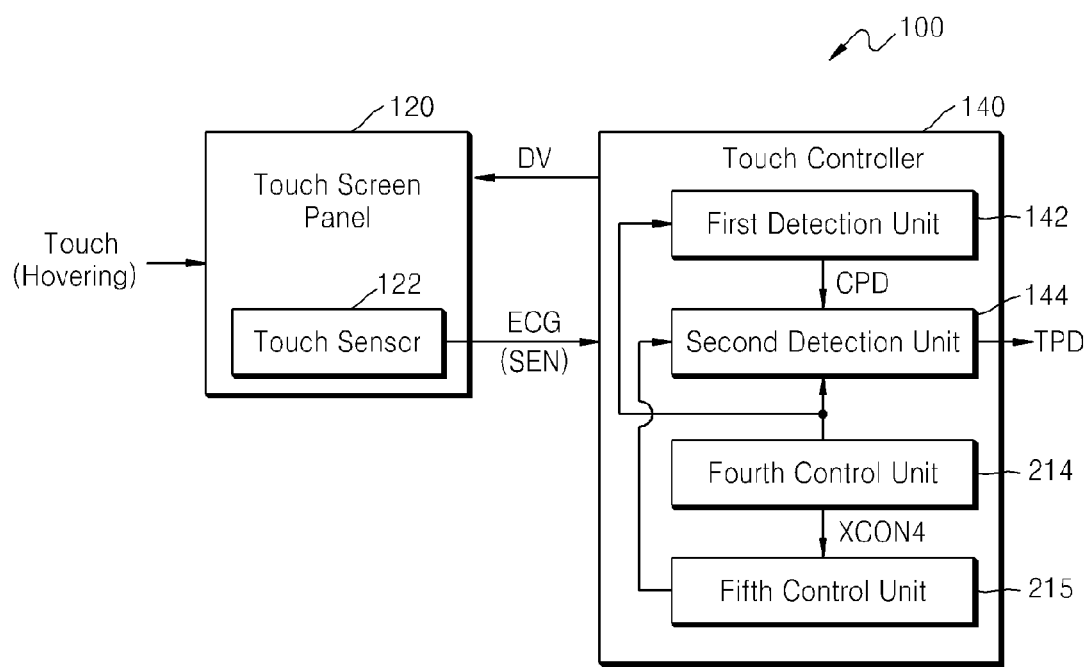
FIG. 26 illustrates the touch sensor of FIG. 1 according to another example embodiment of inventive concepts.

FIG. 26 illustrates the touch sensor 122 of FIG. 1 according to another example embodiment of inventive concepts. Referring to FIG. 26, the touch controller 140 may include a first detection unit 142, a second detection unit 144, a fourth control unit 214, and a fifth control unit 215. The first detection unit 142, the second detection unit 144, and the fourth control unit 214 may be the same as the first detection unit 142, the second detection unit 144, and the fourth control unit 214 of FIG. 25, respectively.

Accordingly, when a hovering is generated with respect to the touch screen panel 120, the fourth control unit 214 may generate a fourth control signal XCON4 of a first value, and when a contact touch is generated with respect to the touch screen panel 120, the fourth control unit 214 may generate a fourth control signal XCON4 of a second value. In response to the fourth control signal XCON4 of the first value, the first detection unit 142 and the second detection unit 144 may generate candidate position data CPD described above and touch position data TPD based on the candidate position data CPD. On the other hand, the first detection unit 142 may be inactivated in response to the fourth control signal XCON4 of the second value. Also, in response to the fourth control signal XCON4 of the second value, the second detection unit 144 may apply a driving voltage DV to all rows R1, R2, . . . , Rn of the sensing array SARY of, for example, FIG. 2, and receive a sensing value SEN from all columns C1, C2, . . . , Cm of the sensing array SARY, thereby generating touch position data TPD with respect to a contact touch in a multi-touch mode.

In response to the fourth control signal XCON4, the fifth control unit 215 may generate a fifth control signal XCON5 through which an operating period is differently set according to whether the second detection unit 144 processes a hovering or a contact touch. For example, in response to the fifth control signal XCON5, when the second detection unit 144 processes a hovering, the second detection unit 144 may apply a driving voltage DC to a row of FIG. 14 or may set a longer period in which a sensing value SEN is received from a column of FIG. 14 than a period in the case when processing a contact touch. Accordingly, as a sensing value SEN is received for a relatively long period for a hovering, the requirement for a relatively high sensing sensitivity may be fulfilled. Also, in the case of a contact touch, sensing accuracy thereof is relatively high, and thus, a sensing value SEN may be reduced within a relatively short time, thereby reducing power consumption.

Figure 27:
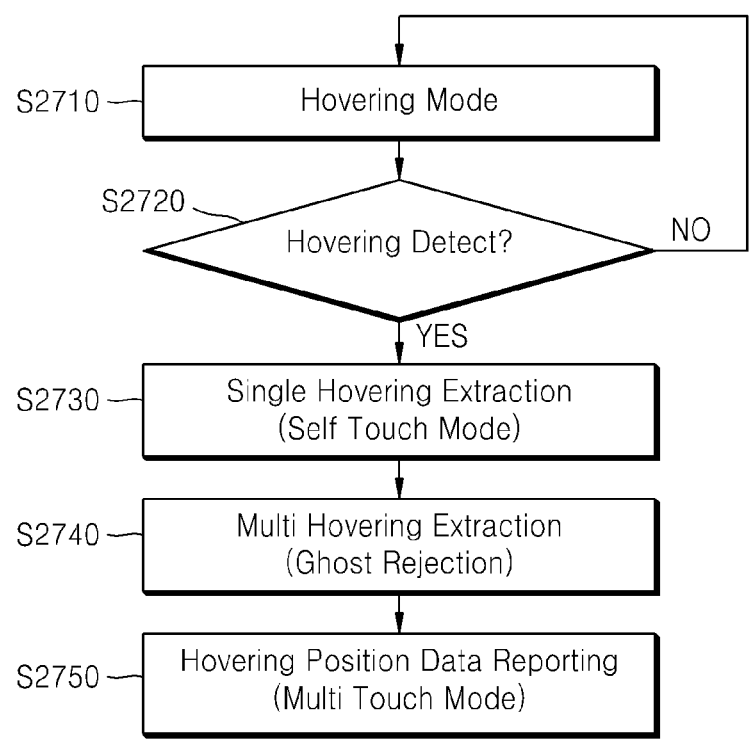
FIG. 27 is a flowchart illustrating a touch sensing method according to an example embodiment of inventive concepts.

FIG. 27 is a flowchart of a touch sensing method according to an example embodiment of inventive concepts. Referring to FIG. 27, the method includes operating in a hovering mode (operation S2710), determining whether a hovering is detected (operation S2720), and if a hovering is generated ("YES" of operation S2720), extracting touch position data including a ghost with respect to the hovering, in a single touch mode (operation S2730). Thus, the candidate position data CPD of FIG. 1 may be generated. Next, the method includes removing a ghost from the touch position data in a multi-touch mode based on the touch position data extracted in a single touch mode (operation S2740) and processing the touch position data from which the ghost is removed, as position data with respect to the hovering (operation S2750).

In the touch sensing method, if no hovering is generated ("NO" of operation S2720), the method may be on standby while in a hovering mode. The hovering mode may be set by using the fourth control unit 214 of FIG. 25 described above. The touch sensing method of FIG. 27 may be performed in the touch sensing device 100 of FIG. 1 or the like. For example, the touch sensing method of FIG. 27 may be performed under a control by a processor of an electronic device in which the touch sensing device 100 of FIG. 1 or the like is included. This also applies to as sensing method described below.

Figure 28:
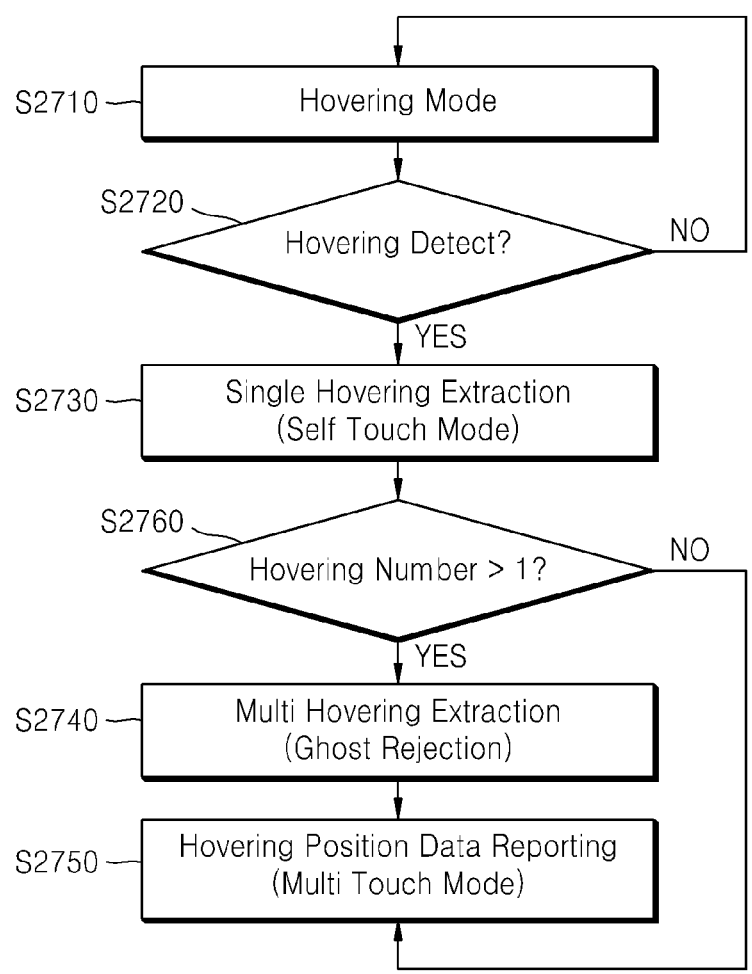
FIG. 28 is a flowchart of a touch sensing method according to another example embodiment of inventive concepts.

FIG. 28 is a flowchart of a touch sensing method according to another example embodiment of inventive concepts. The touch sensing method of FIG. 28 is similar to the touch sensing method of FIG. 27 except that the method may further include counting the number of pieces of candidate position data (operation S2760) after performing sensing in a single touch mode (operation S2730). If there is more than one piece of candidate position data ("YES" of operation S2760), like FIG. 27, removing a ghost by performing a sensing operation in a multi-touch mode (operation S2740) and generating touch position data (operation S2750) may be performed. However, if there is one piece of candidate position data ("NO" of operation S2760), the removing of a ghost by performing a sensing operation in a multi-touch mode (operation S2740) may be omitted but generating the candidate position data as touch position data (operation S2750) may be performed instead.

Figure 29:
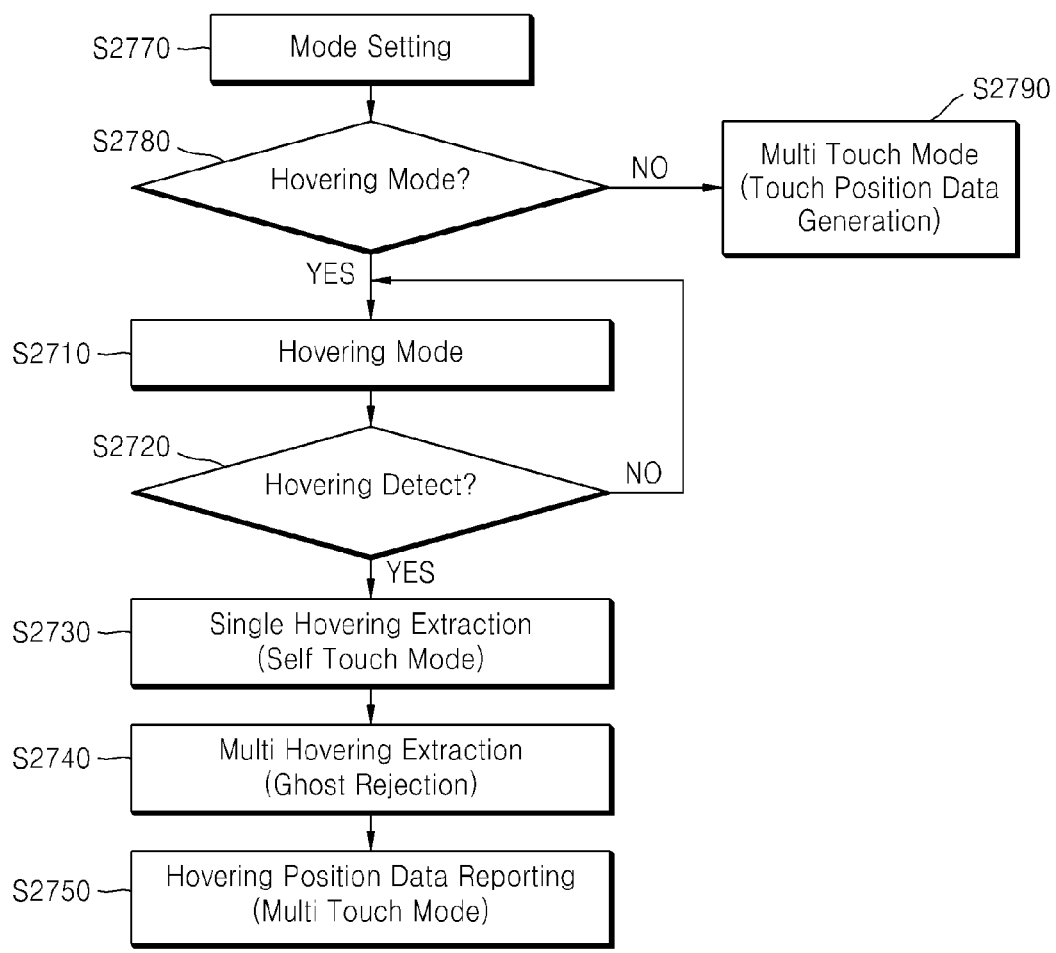
FIG. 29 is a flowchart of a touch sensing method according to another example embodiment of inventive concepts.

FIG. 29 is a flowchart of a touch sensing method according to another example embodiment of inventive concepts. The touch sensing method of FIG. 29 is similar to the touch sensing method of FIG. 27 except that the method may further include, before operating in a hovering mode (operation S2710), setting a touch mode (operation S2770) and determining a hovering mode (operation S2780). As described above, a touch mode indicates either a mode for sensing a hovering or a mode for sensing is contact touch. Setting of a touch mode may be performed using a processor of an electronic device in which the touch sensing device 100 of FIG. 1 or the like is included. Alternatively, a touch mode may be internally set with respect to the touch controller 140 by using the fourth control unit 214 of FIG. 25 described above. For example, the fourth control unit 214 of FIG. 25 may alternately set a hovering mode and a contact touch mode in synchronization with a clock signal CLK.

When a hovering mode is determined ("YES" of operation S2780), touch position data is generated using the touch sensing method of FIG. 27. On the other hand, if a contact touch mode is determined instead of a hovering mode ("NO" of operation S2780), as illustrated in FIG. 25 described above, a single touch mode may not be performed but touch position data may be generated in a multi-touch mode in operation S2790.

Figure 30:
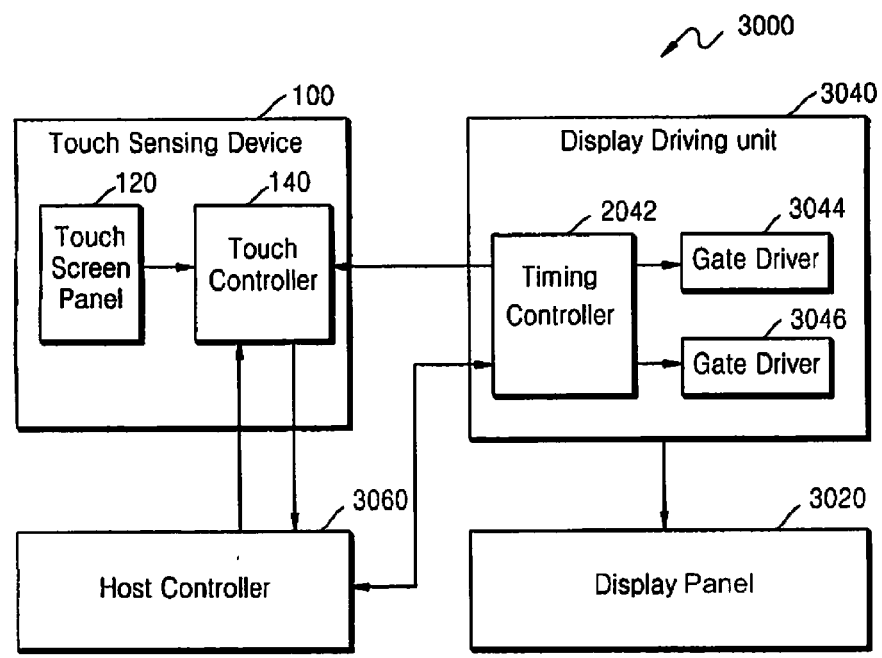
FIG. 30 illustrates a display device according to an example embodiment of inventive concepts.

FIG. 30 illustrates a display device 3000 according to an example embodiment of inventive concepts. Referring to FIGS. 1 and 30, the display device 3000 according to the current embodiment of the inventive concept may include a touch sensing device 100, a display panel 3020, a display driving unit 3040, and a host controller 3060. The touch sensing device 100 may be the touch sensing device 100 of FIG. 1. The touch sensing device 100 may detect a position of a touch generated with respect to the touch screen panel 120 as touch position data TPD by using the touch controller 140. The touch controller 140 controls an operation of the touch sensing device 100. For example, the touch controller 140 may apply a driving voltage to all rows R1, R2, . . . , Rn and all columns C1, C2, . . . , Cm of the sensing array SARY in a single touch mode, and may receive a sensing value SEN from all of the rows R1 R2, . . . , Rn and all of the columns C1, C2, . . . , Cm of the sensing array SARY to thereby detect candidate position data CPD. Alternatively, the touch controller 140 may apply, in a multi-touch mode, a driving voltage to a row of the sensing array SARY with respect to the candidate position data CPD and receive a sensing value SEN from a column of the sensing array SARY with respect to the candidate position data CPD to thereby detect touch position data TPD.

The touch controller 140 may receive at least, one piece of timing information used in driving the display panel 3020, and use the at least one piece of timing information in an operation of generating touch position data. The timing information may be generated from the timing controller 3042 in the driving unit 3040, and also, the timing information may be directly generated from the host controller 3060. The touch controller 140 may perform the above operation according to timing information. For example, the touch controller 140 may use timing information as a clock signal CLK of FIG. 22 or the like.

The display panel 3020 displays an image. As illustrated in FIGS. 5 and 6 above, the display panel 3020 and the touch screen panel 120 may be an On-Cell type or an In-Cell type. The display driving unit 3040 may include a timing controller 3042, a gate driver 3044, and a source driver 3046 for displaying an image on the display panel 3020. The timing controller 3042 generates at least one signal for adjusting a timing of a display operation; for example, the timing controller 3042 may immediately receive a vertical synchronization signal Vsync and a horizontal synchronization signal Hsync from the host controller 3060 or may generate a vertical synchronization signal Vsync and a horizontal synchronization signal Hsync based on a data enable signal (not shown) provided by using the host controller 3060. The vertical synchronization signal Vsync and the horizontal synchronization signal Hsync may be used as timing signals described above. Also, at least one timing signal may be generated to control generation of a common electrode voltage (e.g., a VCOM voltage) and a gate line signal. The gate driver 3044 and the source driver 3046 respectively drive a gate and a source of the display panel 3020 under control of the timing controller 3042.

The host controller 3060 transmits a timing signal to the touch controller 140 and the timing controller 3042 to control the overall operation of the display device 3000. Also, the touch controller 140 generates touch position data TPD above, the host controller 3060 may receive a sensing value SEN from the touch controller 140 to generate the same as touch position data TPD.

Figure 31:
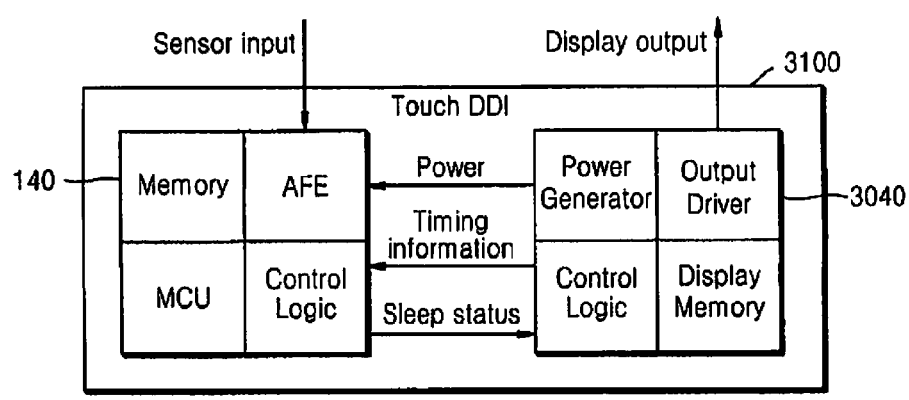
FIG. 31 illustrates a relationship between a timing and a power voltage between a touch controller and a display driving inn of FIG. 30, according to an example embodiment of inventive concepts.

FIG. 31 illustrates a relationship between a timing and a power voltage between the touch controller 140 and the display driving unit 3040 of FIG. 30. As illustrated in FIG. 31, a semiconductor chip 3100 for driving the display device 3000 may include the touch controller 140 and the display driving unit 3040, and the touch controller 140 and the display driving unit 3040 may transmit or receive at least one piece of information such as timing information and status information, to and from each other. Also, the touch controller 140 and the display driving unit 3040 may supply or receive a power voltage to or from each other. The touch controller 140 and the display driving unit 3040 are briefly illustrated in FIG. 31 for convenience of description, and an analog front end (AFE) included in the touch controller 140 may be a block including a voltage reading circuit, an amplification circuit, an integration circuit, and an analog-to-digital converter (ADC).

According to the display device 3000, the touch controller 140 provides the display driving unit 3040 with sleep state information. Also, an example embodiment in which a power voltage used in the touch controller 140 is provided by using the display driving unit 3040 will be described below.

When a screen is turned off and an touch input is not provided (when the touch controller and the display driver are both in a sleep state), the display driving unit 3040 blocks a power voltage or timing information from being provided to the touch controller 140. In this case, the display driving unit 3040 may maintains only a register state thereinside as a previous state. In this case, power consumption may be minimized. Meanwhile, if a touch input is blocked and only the display operation is activated (when the touch controller is in a sleep state and the display driver is in a normal state), the display driving unit 3040 may generate a power voltage for self consumption but the touch controller 140 does not consume power and thus does not provide a power voltage to the touch controller 140. Also, the display driving unit 3040 does not provide timing information to the touch controller 140.

Meanwhile, if a touch input is activated but a display is inactivated (TSC is in a normal state and Display is in a sleep mode), as a touch input is activated, whether a touching operation is periodically performed is checked. In this case, the display driving unit 3040 operates in a low consumption mode to maintain an inactivated state. However, to check a touching operation, the display driving unit 3040 may generate a power voltage used in the touch controller 140 and provides the power voltage to the touch controller 140. Meanwhile, when a touch input and a display are both activated the touch controller and the display driver are both in a normal state), the display driving unit 3040 may generate timing information and a power voltage, and provides the timing information and the power voltage to the touch controller 140.

A power voltage generating unit of the display driving unit 3040 may generate a power voltage if at least one of the touch controller 140 and the display driving unit 3040 is activated. Also, a control logic of the display driving unit 3040 may generate timing information only when the touch controller 140 operates and provide the timing information to the touch controller 140. The control logic of the display driving unit 3040 may include the timing controller 3042.

Figure 32:
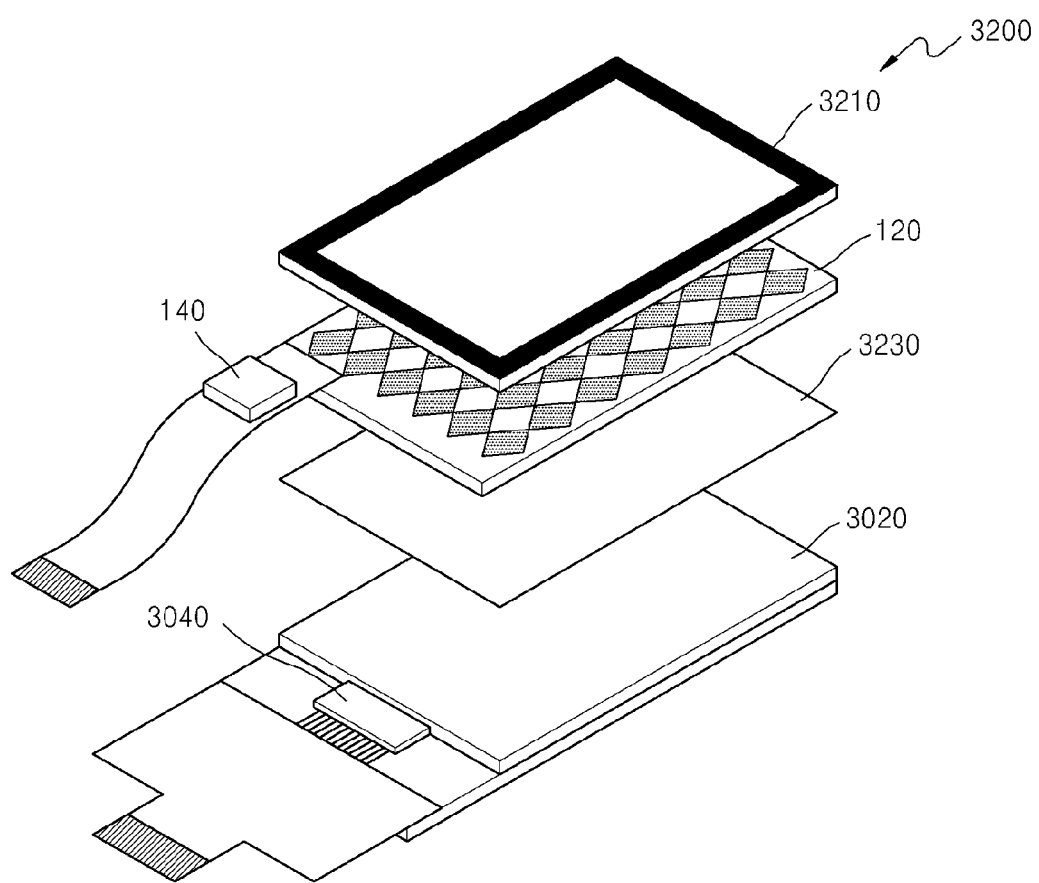
FIG. 32 illustrates a printed circuit board (PCB) structure of a display device mounted with a touch screen panel according to an example embodiment of inventive concepts.

FIG. 32 illustrates a printed circuit board (PCB) structure of a display device 3200 mounted with a touch screen panel 120 according to an example embodiment of inventive concepts. The display device 3200 of FIG. 32 has a structure in which the touch screen panel 120 and the display panel 3020 are distinguished. As illustrated in FIG. 32, the display device 3200 may include a window glass 3210, a touch screen panel 120, and a display panel 3020. Also, a polarization plate 3230 may be further disposed between the touch screen panel 120 and the display panel 3020 to enhance optical characteristics of the display device 3200.

The window glass 3210 is typically formed of an acryl or to tempered glass to thereby protect a module including the display panel 3020 from external impacts or scratches due to repetitive touches. The touch screen panel 120 may be formed by patterning an electrode using a glass substrate or a transparent electrode such as an indium tin oxide (ITO) on a polyethylene terephthalate (PET). The touch controller 140 may be mounted in the form of a chip on board (COB) on a flexible printed circuit board (FPCB), and may sense a change in capacitance from each electrode to extract touch coordinates and provide the touch coordinates to as host controller. The display panel 3020 is typically formed by bonding two sheets of glasses which are included as an upper plate and a lower plate. Also, the display driving unit 3040 is typically attached on a display panel for a mobile device in the form of a chip on glass (COG).

Figure 33:
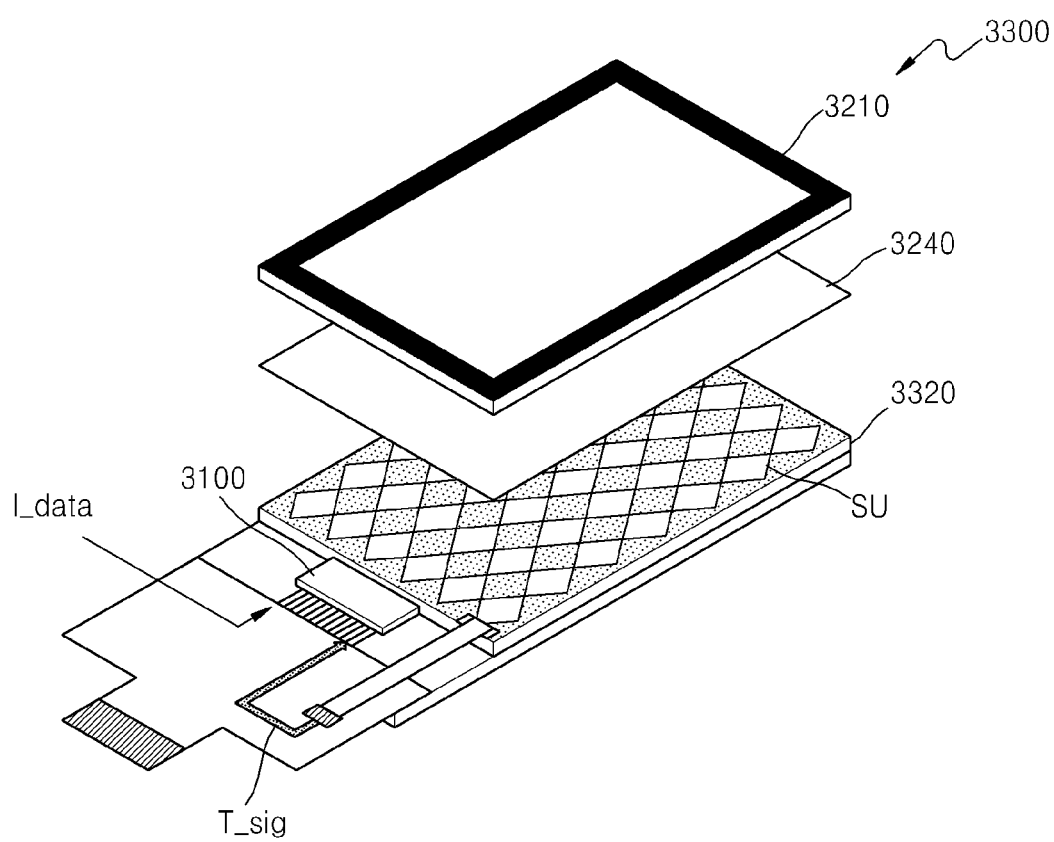
FIG. 33 illustrates a PCB structure in which a touch screen panel and a display panel are integrated, according to an example embodiment of inventive concepts.

FIG. 33 illustrates a PCB structure in which a touch screen panel and a display panel are integrated. As illustrated in FIG. 33, the display device 3300 may include a window glass 3210, a display panel 3320, and a polarization plate 3230. When implementing a touch screen panel, the touch screen panel is not formed on a separate glass substrate but the touch screen panel may be formed by patterning a transparent electrode on an upper plate of the display panel 3320. FIG. 33 illustrates an example embodiment in which a plurality of sensing units SU are formed on the upper plate of the display panel 3320. Also, when a panel structure as described above is formed, a semiconductor chip 3100 in which a touch controller and a display driving unit are integrated may preferably be applied.

When the touch controller 140 and the display driving unit 3040 are integrated on the one semiconductor chip 3100 as illustrated in FIG. 32, a voltage signal T_sig from the sensing unit SU and image data I_data from an external host are provided to the semiconductor chip 3100. Also, the semiconductor chip 3100 processes the image data I_data to generate gradation data for driving an actual display device and provides the gradation data to a display panel. To this end, the semiconductor chip 3100 may include a pad related to touch data T_data and a pad related to the image data I_data and gradation data (not shown). The semiconductor chip 3100 receives a voltage signal T_sig from a sensing unit through a conductive line connected to a first side of the touch screen panel. When arranging pads on the semiconductor chip 3100, in regard to reduction in noise of data a position of a pad that receives the voltage signal T_sig may preferably be arranged adjacent to a conductive line through which the voltage signal T_sig is transmitted.

While not illustrated in FIG. 33, when a conductive line through which gradation data is to be provided to a display panel is disposed opposite to the conductive line through which the touch data voltage signal T_sig, a pad for providing the gradation data may also be disposed opposite to the pad that receives the voltage signal T_sig.

Figure 34:
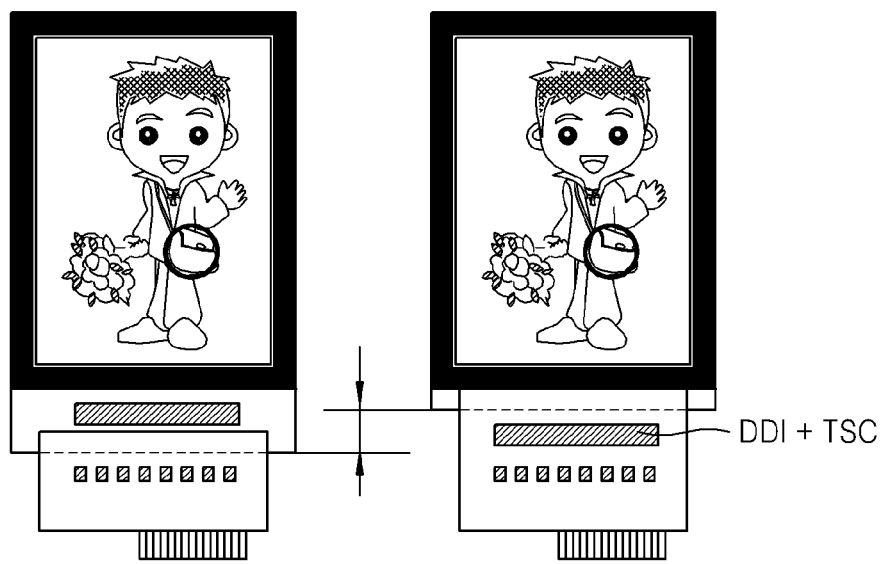
FIG. 34 illustrates a display device mounted with a semiconductor chip including a touch controller and a display driving unit, according to an example embodiment of inventive concepts.

FIG. 34 illustrates a display device mounted with a semiconductor chip including a touch controller and a display driving unit, according to an example embodiment of inventive concepts. In FIG. 34, a semiconductor chip is disposed on a glass of a display panel in the form of a chip on glass (COG), and in FIG. 34, the semiconductor chip is disposed on a film of a display panel in the form of a chip on film (COF). When a touch controller and a display driving unit are disposed as different chips, the touch controller may typically be disposed as a COF and the display driving unit may be typically disposed as a COG but the semiconductor chip in which the touch controller and the display driving unit a may be disposed either in the form of the COG or COF.

Figure 35:
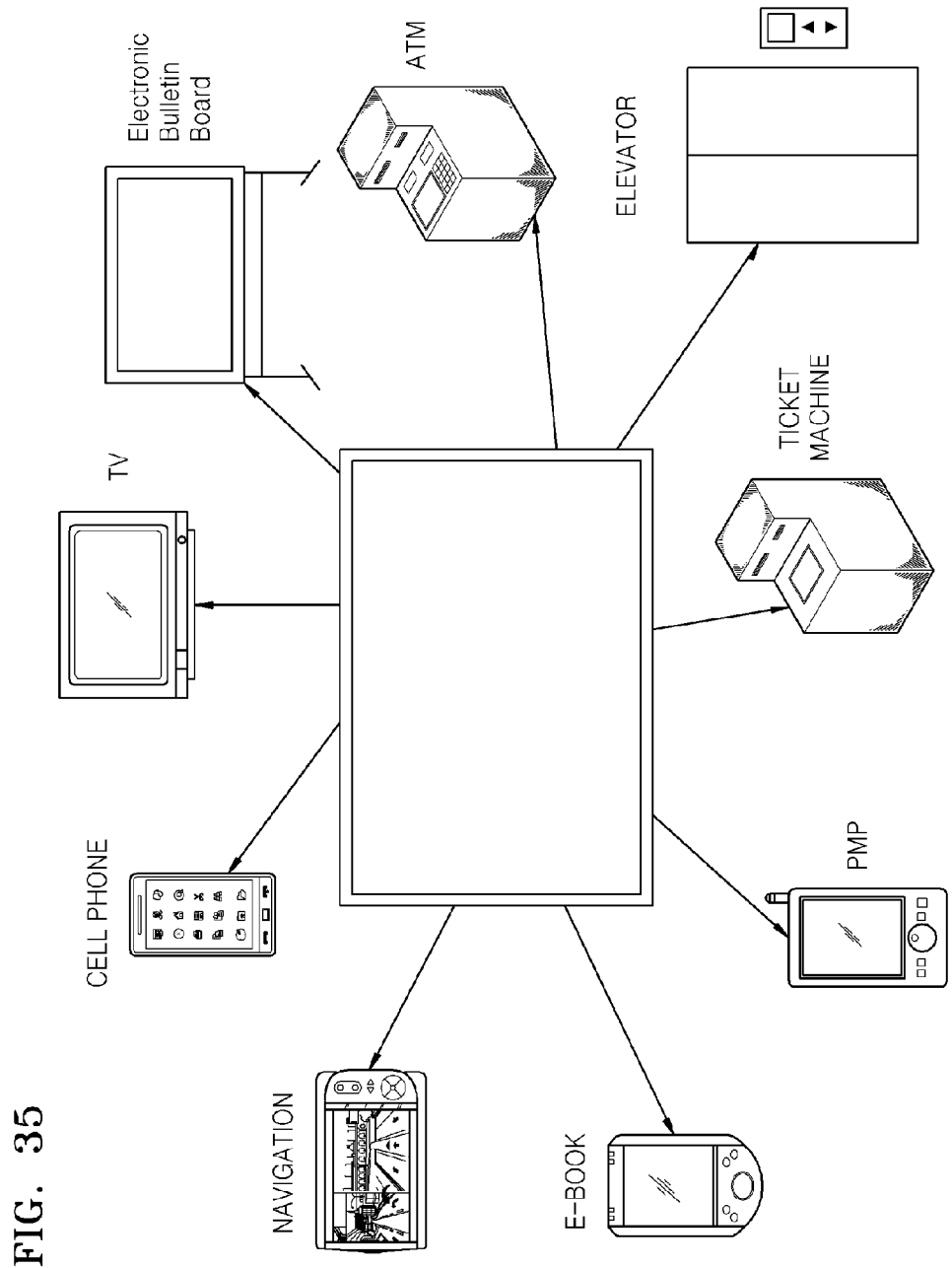
FIG. 35 illustrates application examples of electronic products including a touch sensing device according to an example embodiment of inventive concepts.

FIG. 35 illustrates various application examples of electronic products including the touch sensing device 100 according to an example embodiment of inventive concepts. Referring to FIG. 35, the touch sensing device 100 may be applied in various electronic products. For example, the touch sensing device 100 may be widely used in various electronic devices such as a mobile phone, a TV, an automatic teller machine (ATM) of banks that enables automatic cash input and withdrawal, an elevator, a ticket issuing machine for subways, a portable multimedia player (PMP), an e-book, a navigation device, or an electronic blackboard.

While inventive concepts have been particularly shown and described with reference to example embodiments thereof, it will be understood that various changes in form and details may be made therein without departing from the spirit and scope of the following claims.

What is claimed is:

1. A touch sensing device comprising:
a touch screen panel including a touch sensor configured to generate a first electrical change corresponding to a touch; and
a touch controller configured to detect touch position data with respect to an area on the touch screen panel associated with the touch, based on the first electrical change of the touch sensor,
the touch controller including,
a first detector configured to detect the first electrical change in the touch sensor in a first mode as a plurality of pieces of candidate position data with respect to an area of at least two hoverings; and
a second detector configured to detect a second electrical change in at least one area of the touch sensor corresponding to the plurality of pieces of candidate position data in a second mode that is different from the first mode, the second detector configured to select the touch position data with respect to the at least two hoverings based on the second electrical change.

2. The touch sensing device of claim 1, wherein the first mode is a touch sensing mode with a higher sensing sensitivity with respect to the at least two hoverings than the second mode, and the second mode is a touch sensing mode in which more touches may be sensed at a time than in the first mode.

3. The touch sensing device of claim 1, wherein the first mode is a single touch mode in which only a single touch instance is recognized at a time, and the second mode is a multi-touch mode in which multiple touch instances are recognized at a time.

4. The touch sensing device of claim 1, wherein the touch sensor includes:
a sensing array comprising a plurality of sensors, the at least one area of the touch sensor corresponds to at least one of the sensors.

5. The touch sensing device of claim 4, wherein the sensing array includes a plurality of rows and columns and the first detector sequentially applies a driving voltage to each row and each column of the sensing array in the first mode to receive a change in a voltage of each row and each column as the first electrical change.

6. The touch sensing device of claim 4, wherein the sensing array includes a plurality of rows and columns and the second detector sequentially applies a driving voltage to each row corresponding to the candidate position data of the sensing array in the second mode and receives a change in a voltage of each column corresponding to the candidate position data of the sensing array as the second electrical change.

7. The touch sensing device of claim 6, wherein the second detector is configured to compare voltages of columns, respectively, with respect to at least two pieces of candidate position data of the same row of the sensing array and select one of the at least two pieces of candidate position data of the same row as one of the touch position data.

8. The touch sensing device of claim 4, wherein the sensing array includes groups of rows and groups of columns corresponding to the candidate position data and the second detector sequentially applies a driving voltage to each group of rows corresponding to the candidate position data of the sensing array in the second mode and receives a change in a voltage of each group of columns corresponding to the candidate position data of the sensing array as the second electrical change.

9. The touch sensing device of claim 8, wherein the second detector applies the driving voltage to each of at least two rows included in a same group of rows.

10. The touch sensing device of claim 8, wherein the second detector is configured to obtain a change in a voltage of each of at least two columns included in a same group of columns during a period corresponding to the number of columns included in each group of columns, and the second detection circuit is configured to determine the touch position data based on the obtained change.

11. The touch sensing device of claim 8, wherein the second detector is configured to obtain a sum of voltages of at least two columns included in a same group of columns and determine the touch position data based on the obtained sum.

12. The touch sensing device of claim 8, wherein the second detector is configured to compare voltages of at least two pieces of candidate position data of a same group of rows of the sensing array and detect one of the at least two pieces of candidate position data of the same group of rows as one of the touch position data.

13. The touch sensing device of claim 1, wherein the touch controller is configured to detect the candidate position data as the touch position data if there is one piece of the candidate position data.

14. The touch sensing device of claim 1, wherein the touch controller is configured to detect an electrical change of the touch sensor corresponding to a contact touch.

15. The touch sensing device of claim 14, wherein the touch controller further comprises:
a control unit configured to set a period to process the contact touch, the period to process the contact touch being longer than a period to process one of the at least two hoverings.

16. An electronic device comprising:
the touch sensing device of claim 1.

* * * * *